US011510228B2

(12) United States Patent
Yang et al.

(10) Patent No.: US 11,510,228 B2
(45) Date of Patent: Nov. 22, 2022

(54) AUTONOMOUS TRANSMISSION OF UPLINK CONTROL INFORMATION

(71) Applicant: Telefonaktiebolaget LM Ericsson (publ), Stockholm (SE)

(72) Inventors: Yu Yang, Solna (SE); Jung-Fu Cheng, Fremont, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 75 days.

(21) Appl. No.: 16/635,023

(22) PCT Filed: Aug. 7, 2018

(86) PCT No.: PCT/EP2018/071424
§ 371 (c)(1),
(2) Date: Jan. 29, 2020

(87) PCT Pub. No.: WO2019/030237
PCT Pub. Date: Feb. 14, 2019

(65) Prior Publication Data
US 2020/0383132 A1    Dec. 3, 2020

Related U.S. Application Data

(60) Provisional application No. 62/544,201, filed on Aug. 11, 2017.

(51) Int. Cl.
*H04W 72/12* (2009.01)
*H04B 7/06* (2006.01)
(Continued)

(52) U.S. Cl.
CPC ...... *H04W 72/1268* (2013.01); *H04B 7/0626* (2013.01); *H04L 1/0003* (2013.01);
(Continued)

(58) Field of Classification Search
CPC .................................................. H04W 72/1268
See application file for complete search history.

(56) References Cited

U.S. PATENT DOCUMENTS

| 2015/0049718 A1 | 2/2015 | Han et al. |
| 2016/0050632 A1 | 2/2016 | Falahati et al. |

(Continued)

FOREIGN PATENT DOCUMENTS

| CN | 104918312 A | 9/2015 |
| RU | 2565030 C2 | 10/2015 |

(Continued)

OTHER PUBLICATIONS

International Search Report dated Nov. 16, 2018 for International Application PCT/EP2018/071424 filed on Aug. 11, 2017, consisting of 11-pages.

(Continued)

*Primary Examiner* — Jason E Mattis
(74) *Attorney, Agent, or Firm* — Christopher & Weisberg, P.A.

(57) ABSTRACT

Some embodiments advantageously provide methods, wireless devices and network nodes for unscheduled uplink access on an unlicensed cell. According to one aspect, an exemplary process includes a wireless device for autonomously transmitting uplink control information, UCI, together with autonomous uplink, UL, data transmission. The process includes mapping the UCI to time-frequency resources of the PUSCH and transmitting the PUSCH with the UCI to a base station without a dynamic uplink grant from the base station.

29 Claims, 24 Drawing Sheets

(51) Int. Cl.
   *H04L 1/00*    (2006.01)
   *H04L 1/18*    (2006.01)
   *H04L 1/20*    (2006.01)
   *H04L 5/00*    (2006.01)
   *H04W 72/04*   (2009.01)
   *H04W 74/08*   (2009.01)

(52) U.S. Cl.
   CPC ............ *H04L 1/1819* (2013.01); *H04L 1/203* (2013.01); *H04L 5/0055* (2013.01); *H04W 72/0413* (2013.01); *H04W 72/0446* (2013.01); *H04W 72/0453* (2013.01); *H04W 74/0808* (2013.01)

(56) References Cited

U.S. PATENT DOCUMENTS

| | | | |
|---|---|---|---|
| 2017/0135049 A1 | 5/2017 | Seo et al. | |
| 2017/0164390 A1 | 6/2017 | Zeng et al. | |
| 2017/0230838 A1 | 8/2017 | Yerramalli et al. | |
| 2018/0027549 A1* | 1/2018 | Wang | H04L 5/0044 370/329 |
| 2018/0227936 A1* | 8/2018 | Yerramalli | H04L 27/2662 |
| 2019/0029046 A1* | 1/2019 | Li | H04L 1/0003 |
| 2019/0166610 A1* | 5/2019 | Lee | H04W 72/1268 |
| 2019/0174540 A1* | 6/2019 | Yoshimura | H04L 1/1819 |
| 2020/0037359 A1* | 1/2020 | Wang | H04L 1/1896 |
| 2020/0127798 A1* | 4/2020 | Yang | H04W 16/14 |

FOREIGN PATENT DOCUMENTS

| | | |
|---|---|---|
| RU | 2627300 C1 | 8/2017 |
| WO | 2017095596 A1 | 6/2017 |
| WO | 2017099860 A1 | 6/2017 |
| WO | 2017105802 A1 | 6/2017 |

OTHER PUBLICATIONS

3GPP TS 36.212 V14.3.0 3rd Generation Partnership Project; Technical Specification Group Radio Access Network; Evolved Universal Terrestrial Radio Access (E-UTRA); Multiplexing and channel coding (Release 14); Jun. 2017, consisting of 198-pages.
3GPP TS 36.213 V14.3.0 3rd Generation Partnership Project Technical Specification Group Radio Access Network; Evolved Universal Terrestrial Radio Access (E-UTRA); Physical layer procedures (Release 14); Jun. 2017, pp. 50-305, consisting of 256-pages.
3GPP TS 36.212 V14.1.1 3rd Generation Partnership Project; Technical Specification Group Radio Access Network; Evolved Universal Terrestrial Radio Access (E-UTRA); Multiplexing and channel coding (Release 14); Jan. 2017, consisting of 149-pages.
3GPP TS 36.321 V14.3.0 3rd Generation Partnership Project; Technical Specification Group Radio Access Network; Evolved Universal Terrestrial Radio Access (E-UTRA); Medium Access Control (MAC) protocol specification (Release 14); Jun. 2017, consisting of 107-pages.
Russian Decision on Grant, Search Report and English Translation dated Aug. 27, 2020 for Application No. 2020109953, consisting of 27-pages.
Chinese Office Action and English machine translation dated Jan. 26, 2022 for Application No. 201880066395.1, consisting of 10 pages.
Performance Study of Carrier Aggregation in Homogeneous and Heterogeneous Networks; 2011, consisting of 75 pages.
Japanese Office Action and English Summary dated Jul. 15, 2022 for Application No. 2021-073619, consisting of 4 pages.
3GPP TSG RAN WG1 Meeting #90 R1-1713310; Title: On AUL support on LAA sCell; Source: Ericsson; Agenda Item 5.2.2.3.1; Document for: Discussion and Decision; Location and Date: Prague, Czech Republic, Aug. 21-25, 2017, consisting of 5 pages.
3GPP TSG-RAN WG1 Meeting #91 R1-1720372; Title: on AUL Configuration and Activation; Source: Ericsson Agenda Item: 6.2.2.2.1; Document for: Discussion and Decision; Location and Date: Reno, USA, Nov. 27-Dec. 1, 2017, consisting of 9 pages.

* cited by examiner

AUTONOMOUS TRANSMISSION OF UPLINK CONTROL INFORMATION

CROSS-REFERENCE TO RELATED APPLICATIONS

This application is a Submission Under 35 U.S.C. § 371 for U.S. National Stage Patent Application of International Application No.: PCT/EP2018/071424, filed Aug. 7, 2018 entitled "AUTONOMOUS TRANSMISSION OF UPLINK CONTROL INFORMATION," which claims priority to U.S. Provisional Application No. 62/544,201, filed Aug. 11, 2017, entitled "UPLINK CONTROL SIGNALING FOR UNSCHEDULED UPLINK ACCESS ON UNLICENSED CELL," the entireties of both of which are incorporated herein by reference.

TECHNICAL FIELD

This disclosure relates to autonomous transmission of uplink control signaling.

BACKGROUND

The Third Generation Partnership Project (3GPP) work on "Licensed-Assisted Access" (LAA) intends to allow Long Term Evolution (LTE) equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows completely standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework enables aggregation of two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a listen-before-talk (LBT) method is applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL), i.e., from wireless device to base station, performance is especially hampered. UL transmission is becoming more and more important with user-centric applications and the need for pushing data to the cloud.

Today, the unlicensed 5 GHz spectrum is mainly used by equipment implementing the Institute of Electrical and Electronics Engineers (IEEE) 802.11 Wireless Local Area Network (WLAN) standard. This standard is typically known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

LTE uses orthogonal frequency division multiplexing (OFDM) in the downlink (DL) and discrete Fourier transform (DFT)-spread (also referred to as single-carrier frequency division multiple access (FDMA)) in the uplink. The basic LTE downlink physical resource can thus be seen as a time-frequency grid as illustrated in FIG. 1 where each resource element corresponds to one OFDM subcarrier during one OFDM symbol interval. The uplink subframe has the same subcarrier spacing as the downlink and the same number of single carrier (SC)-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 1. Each subframe comprises two slots of duration 0.5 ms each, and the slot numbering within a frame ranges from 0 to 19. For normal cyclic prefix (CP), one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3. The reference symbols shown in FIG. 3 are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the physical uplink shared channel (PUSCH), uplink control information in the physical uplink control channel (PUCCH), and various reference signals such as demodulation reference signals (DMRS) and sounding reference signals (SRS). DMRS are used for coherent demodulation of the PUSCH and the PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10, only the Physical Downlink Control Channel (PDCCH) is available. Resource grants are wireless device specific and are indicated by scrambling the DCI Cyclic Redundancy Check (CRC) with the wireless device-specific cell radio network temporary identifier (C-RNTI). A unique C-RNTI is assigned by a cell to every wireless device associated with it, and can take values in the range 0001-FFF3 in hexadecimal format. A wireless device uses the same C-RNTI on all serving cells.

Scheduled LTE Uplink Scheme

In LTE, the uplink access is typically controlled, i.e., scheduled, by the base station, e.g., eNB. In this case, the wireless device would report to the eNB when data is available to be transmitted, e.g., by sending a scheduling request message (SR). Based on this, the eNB would grant the resources and relevant information to the wireless device in order to carry out the transmission of a certain size of data. The assigned resources are not necessarily sufficient for the wireless device to transmit all the available data. Therefore, it is possible that the wireless device sends a buffer status report (BSR) control message in the granted resources, in order to inform the eNB about the correct size and updated size of the data waiting for transmission. Based on that, the eNB would further grant the resources to carry on with the wireless device uplink transmission of the corrected size of data.

In more detail, every time new data arrives at the wireless device's empty buffer, the following procedure should be performed:

Using the Physical Uplink Control Channel (PUCCH), the wireless device informs the network that it needs to transmit data by sending a Scheduling Request (SR) indicating that it needs uplink access. The wireless device has periodic timeslots for SR transmissions (typically on a 5, 10, or 20 ms interval).

Once the eNB receives the SR request bit, it responds with a small "uplink grant" that is just large enough to communicate the size of the pending buffer. The reaction to the scheduling request typically takes 3 ms.

After the wireless device receives and processes (takes about 3 ms) its first uplink grant, it typically sends a Buffer Status Report (BSR) that is a media access control (MAC) Control Element (MAC CE) used to provide information about the amount of pending data in the uplink buffer of the wireless device. If the grant is big enough, the wireless device sends data from its buffer within this transmission as well. Whether the BSR is sent depends also on conditions specified in 3GPP Technical Standard, see for example (TS) 36.321 V.14.3.0 (2017-06-23).

The eNB receives the BSR message, allocates the necessary uplink resources and sends back another uplink grant that will allow the device to drain its buffer.

Adding it all up, about 16 ms (plus time to wait for a PUCCH transmission opportunity) of delay can be expected between data arrival at the empty buffer in the wireless device and reception of this data in the eNB.

In cases where the wireless device is not radio resource control (RRC) connected in LTE or has lost its uplink synchronization since it did not transmit or receive anything for a certain time, the wireless device would use the random access procedure to connect to the network, obtain synchronization and also send the SR. In this case, the procedure for enabling uplink of the data in the wireless device buffer would take even longer than the non-random case where the SR transmission is on the PUCCH.

Downlink Control Information (DCI) for Scheduling LTE Uplink Transmission

In the LTE system, the transmission formats and parameters are controlled by the eNB. Such downlink control information (DCI) typically contains:

Resources allocated for UL transmission (including whether frequency hopping is applied);
Modulation and coding scheme (MCS);
Redundancy versions;
New data indicator;
Transmit power control command;
Information about demodulation reference symbols (DMRS);
In case of cross-carrier scheduling, the target carrier index is also included;
Other applicable control information on UL transmissions.

The DCI is first protected by a 16-bit cyclic redundancy check (CRC). The CRC bits are further scrambled by the wireless device and assigned an identity cell-radio network temporary identifier (C-RNTI). The DCI and scrambled CRC bits are further protected by convolutional coding. The encoded bits are transmitted from the eNB to the wireless device using either the physical downlink control channel (PDCCH) or evolved PDCCH (EPDCCH).

Hybrid Automated Repeat Request (HARQ) Design

For Frequency Division Duplex (FDD):

Asynchronous hybrid automatic repeat request (HARQ) is used for the downlink. This means that 8 HARQ processes can be used in any order. Nevertheless, the eNB sends a Process ID and a redundancy version (RV) in the physical downlink control channel (PDCCH) so that the wireless device can know which HARQ process it received during a certain subframe.

For the uplink, Synchronous HARQ is used. The wireless device uses the same HARQ process number every 8 subframes. Since a specific HARQ process ID is used at a specific subframe, the receiver at the eNode B knows exactly which HARQ process comes and when. Also, the eNodeB can know about RV because the UL Grant (DCI 0) from the eNodeB can specify the RV using the modulation and coding scheme (MCS) field. The eNodeB has two modes of operation: Adaptive HARQ and Non-Adaptive HARQ. With Adaptive HARQ, the wireless device does not care about HARQ feedback on the physical Hybrid Indicator channel (PHICH), and the wireless device retransmits based on DCI 0 information. Non-adaptive retransmission follows a HARQ feedback (PHICH=non-acknowledgment (NACK)) without a DCI 0 and the wireless device retransmits using the same downlink control information (resource blocks (RB), MCS, etc.) as the initial transmission.

For Time Division Duplex (TDD):

One UL subframe acknowledgment of multiple DL transport blocks is supported since some TDD configurations contain an unequal number of DL/UL subframes. The PUCCH design for TDD is different than FDD. For TDD, multiple acknowledgements per wireless device are carried. An alternative mechanism that allows for reuse of the FDD PUCCH design is also provided in LTE TDD, where the acknowledgment corresponding to multiple DL transmissions are grouped using a logical "AND" operation to form a single acknowledgment as to whether zero or more than zero blocks were received in error. However, this requires retransmission of all the HARQ processes if at least one of them is not acknowledged.

Wireless Local Area Network (WLAN)

In typical deployments of WLAN, carrier sense multiple access with collision avoidance (CSMA/CA) is used for medium access. This means that the channel is sensed to perform a clear channel assessment (CCA), and a transmission is initiated only if the channel is declared Idle. If the channel is declared as Busy, the transmission is essentially deferred until the channel is deemed to be Idle.

A general illustration of the listen before talk (LBT) mechanism of Wi-Fi is shown in FIG. 5. After a Wi-Fi station A transmits a data frame to a station B, station B shall transmit the acknowledgement (ACK) frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied. Therefore, a station that wishes to transmit, first performs a CCA by sensing the medium for a fixed duration DIFS. If the medium is idle, then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in specification of the Institute of Electrical and Electronics Engineers (IEEE). Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specifications. When a station succeeds in a transmission without collision, the station resets its random backoff contention window size back to the default value CWmin.

Licensed-Assisted Access (LAA) to Unlicensed Spectrum Using LTE

Up to now, the spectrum used by LTE is dedicated to LTE. This has the advantage that the LTE system is indifferent to the coexistence issue and the spectrum efficiency can be maximized. However, the spectrum allocated to LTE is limited and cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects that the channel is occupied.

One way to utilize the unlicensed spectrum reliably is to transmit essential control signals and channels on a licensed carrier. That is, as shown in FIG. 6, a wireless device is connected to a primary cell (PCell) in the licensed band and one or more secondary cells (SCells) in the unlicensed band. This disclosure denotes a secondary cell in the unlicensed spectrum as licensed-assisted access secondary cell (LAA SCell). In the case of standalone operation as in MulteFire, no licensed cell is available for uplink control signal transmissions.

HARQ Design

In the LAA study item asynchronous hybrid automated repeat request (HARQ) is recommended for the LAA physical uplink shared channel (PUSCH). That means UL retransmissions may not only occur one round trip time (RTT) (e.g., n+8) after the initial transmission, but rather, at any point in time. This is considered beneficial in particular when retransmissions are blocked and postponed due to LBT. When introducing asynchronous HARQ, the wireless device should therefore assume that all transmitted UL HARQ processes were successful (set local status to ACK). The wireless device performs a HARQ retransmission for a HARQ process only upon reception of a corresponding UL grant (new data indicator (NDI) not toggled) from the eNB.

MulteFire (MF)

Downlink HARQ

After reception of the PDCCH/EPDCCH and the associated physical downlink shared channel (PDSCH) in subframe 'n', the wireless device should have the associated HARQ feedback ready for transmission in subframe 'n+4'. The wireless device should transmit any pending HARQ feedback at the earliest possible uplink transmission opportunity following the 'n+4' constraint. The uplink transmission opportunity is defined according to either MF-sPUCCH or MF-ePUCCH resources being available for the wireless device. When transmitting the HARQ feedback associated with the PDSCH, the wireless device shall collect pending HARQ feedback. The pending HARQ feedback may potentially include feedback for several downlink transmissions. The pending HARQ feedback is collected in a bitmap with an implicit association between the index in the bitmap and the HARQ process ID. The size of this bitmap is configurable by the eNB. The maximum number of HARQ processes for DL operation is 16. When signaled in the MF-ePUCCH/sPUCCH bitmap, the default status of a HARQ-ID packet is NACK unless there is an ACK available to be sent.

Uplink HARQ

MF adopts asynchronous UL HARQ operations as introduced in LTE Rel-13 for evolved machine type communication (eMTC). There is no support for non-adaptive HARQ operations, and the wireless device should ignore any information content on the PHICH resources with respect to HARQ operation. The PHICH resources are maintained as part of the downlink transmission resources, but the information content is reserved for future use. Any uplink transmission (new transmission or retransmission) is scheduled by UL grants through PDCCH/EPDCCH.

Unscheduled Uplink for LAA/MulteFire

For LTE UL channel access, both wireless device and eNB should perform LBT operations corresponding to the scheduling request, scheduling grant and data transmission phases. In contrast, Wi-Fi terminals perform LBT only once in the UL data transmission phase. Moreover, Wi-Fi terminals can asynchronously send data compared to the synchronized LTE system. Thus, Wi-Fi terminals have a natural advantage over LTE terminals in UL data transmission, and superior performance in collocated deployment scenarios may be seen in simulation studies. Overall study results show that Wi-Fi has a better uplink performance than LTE, particularly in low-load or less congested network conditions. As the network congestion or load is increased, the LTE channel access mechanism (time division multiple access (TDMA) type) becomes more efficient, but Wi-Fi uplink performance is still superior.

Both MulteFire and 3GPP developers are discussing the support of unscheduled UL, i.e., autonomous UL or grantless UL on unlicensed cells. For example, a transmission for a semi-persistent grant may be considered an UL transmission without a dynamic UL grant. This way, the wireless device can autonomously transmit the PUSCH without a dynamic UL grant and therefore UL latency can be lower by reducing the control signaling related to scheduling that precede every UL transmission. It has been shown that autonomous UL LAA performs significantly better than scheduled UL at low load due to the reduced signaling overhead. In addition, it coexists fairly with current Wi-Fi networks In scheduled mode, the UL access is eNB-controlled and is indicated to the wireless device via a dynamic UL grant including time frequency resources, modulation and coding scheme, HARQ process ID, new data indicator (NDI), redundancy version (RV), etc. The wireless device then attempts to access the channel for the time for which the grant is valid, and once LBT succeeds, the wireless device sends an UL with the configuration indicated in the UL grant. Then the eNB detects and decodes the UL. The situation will not be straight forward in unscheduled mode. In unscheduled mode, the eNB does not know when to expect the UL transmission because the wireless device autonomously sends the UL transmission without a dynamic UL grant. Therefore, additional UL control signaling is desired to avoid any ambiguity and support efficient autonomous UL operation.

MulteFire has agreed to introduce new uplink control information (G-UCI) including the following information:
HARQ processes
Explicit C-RNTI UEID is contained in the G-UCI
NDI, RV is contained in the G-UCI
Mean channel open time (MCOT) related information is contained in the G-UCI
the eNB decides whether to share;
Remaining MCOT up to 10 states;
1 bit flag to indicate the ending GUL subframe;
For further study (FFS): other states to indicate the ending of GUL, then drop 1 bit flag
MCS is not contained in G-UCI
No A-channel state indicator, HARQ ACK/NACK in the GUL PUSCH The G-UCI physical channel should reuse the MF1.0 rate matching for acknowledgement/non-acknowledgement (ACK/NCK) and channel state information (CSI), and is transmitted in every GUL subframe and scrambled with cell specific pre-defined values.

Although G-UCI has been agreed to be supported for Multi-Fire, it is unclear how G-UCI is to be processed and transmitted on the physical layer.

SUMMARY

Some of the problems associated with unscheduled uplink access on an unlicensed cell are addressed by embodiments disclosed herein. Transmitting uplink control information, UCI, autonomously in a licensed-assisted access, LAA, MulteFire or NR unlicensed (NR-U) access, said transmissions being without an UL grant from a base station enables the wireless device to transmit effectively and efficiently with an increased reception success and improved coexistence with other unlicensed wireless devices.

Some embodiments advantageously provide methods, wireless devices and network nodes for unscheduled uplink access on an unlicensed cell. According to one aspect, an exemplary process includes a wireless device for transmitting uplink control information, UCI, autonomously in a licensed-assisted access, LAA, communication system. The process includes including, via the PUSCH configuration unit, in the UCI, at least one of a starting and ending position of a physical uplink shared channel, PUSCH. The process also includes mapping, via the PUSCH configuration unit, the UCI to time-frequency resources of the PUSCH.

Some embodiments advantageously provide a method and system for uplink control signaling for unscheduled uplink access on an unlicensed cell. In some embodiments, physical layer processing methods of new UL control signaling (UCI) for autonomous UL access on an unlicensed cell are provided. In some embodiments, two cases are considered: 1) only full subframe transmission is supported for autonomous UL and 2) half subframe transmission is supported for the first subframe in an UL burst. The physical layer processing of UCI may include channel coding, modulation and resource element (RE) mapping. The UCI is transmitted in an efficient and robust way to assist autonomous UL transmission on unlicensed band.

According to one aspect, a method performed by a wireless device, wireless device, for autonomously transmitting uplink control information, UCI, together with autonomous uplink, AUL, data transmission. The method includes mapping the UCI to time-frequency resources of a physical uplink shared channel, PUSCH. The method also includes transmitting the PUSCH with the UCI on an uplink transmission, the uplink transmission being without a dynamic uplink grant from a base station.

According to this aspect, in some embodiments, the UCI includes at least one of a starting and ending position of a physical uplink shared channel, PUSCH. In some embodiments, the UCI indicates whether the PUSCH on one of a current subframe and a next subsequent subframe is shortened. In some embodiments, the UCI includes at least one of a listen-before-talk, LBT, priority class, a number of subframes reserved for uplink transmission a hybrid automatic repeat request, HARQ, identification, a new data indicator, a redundancy version, a wireless device identifier, and a channel occupancy time, COT, indicator. In some embodiments, if the UCI is transmitted on the PUSCH, the UCI and the AUL data transmission are multiplexed such that the UCI is mapped from symbol 1 to symbol 12 of a subframe. In some embodiments, a beta offset value to account for different block error rate, BLER, targets and encoding schemes is configured in the wireless device to determine how many coded modulation symbols to use for carrying the UCI in the PUSCH. In some embodiments, beta offset values are mapped by reusing a predetermined hybrid automatic repeat request, HARQ, acknowledgement, ACK, offset mapping table. In some embodiments, the beta offset value is fixed and predefined. In some embodiments, the UCI is mapped to the PUSCH starting from a first symbol in time of the PUSCH and from a lowest physical resource block, PRB, index in frequency of the PUSCH. In some embodiments, the UCI is mapped to the PUSCH starting from a second symbol in time of the PUSCH and from a lowest physical resource block, PRB, index in frequency of the PUSCH. In some embodiments, if a shortened PUSCH is supported, the UCI is mapped in a same manner that aperiodic channel state information, CSI, is mapped by starting from a lowest physical resource block, PRB, index but not on a first or last symbol of the PUSCH. In some embodiments, the PUSCH further includes aperiodic channel state information, CSI. In some embodiments, the method further includes determining a number of coded UCI symbols by one of calculation and reading from a look-up table based on a Modulation Coding Scheme, MCS, of the PUSCH. In some embodiments, the method further includes inserting one of zero and null symbols into coded UCI symbols to be mapped to the PUSCH. In some embodiments, UCI is transmitted on PUSCH starting from a seventh symbol in time of the PUSCH and from a lowest physical resource block, PRB, index in frequency of the PUSCH, wherein a bit in the UCI indicates half subframe transmission for the PUSCH. In some embodiments, the uplink transmission is without an uplink grant from the base station.

According to another aspect, a wireless device, wireless device, for autonomously transmitting uplink control information, UCI, together with autonomous uplink, AUL, data transmission is provided. The wireless device includes processing circuitry configured to map the UCI to time-frequency resources of a physical uplink shared channel, PUSCH, and transmit the PUSCH with the UCI on an uplink transmission, the uplink transmission being without a dynamic uplink grant from a base station.

According to this aspect, in some embodiments, the UCI includes at least one of a starting and ending position of a physical uplink shared channel, PUSCH. In some embodiments, the UCI indicates whether the PUSCH on one of a current subframe and a next subsequent subframe is shortened. In some embodiments, the UCI includes at least one of a listen-before-talk, LBT, priority class, a number of subframes reserved for uplink transmission a hybrid automatic repeat request, HARQ, identification, a new data indicator, a redundancy version, a wireless device identifier, and a channel occupancy time, COT, indicator. In some embodiments, if the UCI is transmitted on the PUSCH, the UCI and the AUL data transmission are multiplexed such that the UCI is mapped from symbol 1 to symbol 12 of a subframe. In some embodiments, a beta offset value to account for different block error rate, BLER, targets and encoding schemes is configured in the wireless device to determine how many coded modulation symbols to use for carrying the UCI in the PUSCH. In some embodiments, beta offset values are mapped by reusing a predetermined hybrid automatic repeat request, HARQ, acknowledgement, ACK, offset mapping table. In some embodiments, the beta offset value is fixed and predefined. In some embodiments, the UCI is mapped to the PUSCH starting from a first symbol in time of the PUSCH and from a lowest physical resource block, PRB, index in frequency of the PUSCH. In some embodiments, the UCI is mapped to the PUSCH starting from a second symbol in time of the PUSCH and from a lowest physical resource block, PRB, index in frequency of the PUSCH. In some embodiments, if a shortened PUSCH is supported, the UCI is mapped in a same manner that aperiodic channel state information, CSI, is mapped by starting from a lowest physical resource block, PRB, index but not on a first or last symbol of the PUSCH. In some embodiments, the PUSCH further includes aperiodic channel state information, CSI. In some embodiments, the processing circuitry is further configured to determine a number of coded UCI symbols by one of calculation and reading from a look-up table based on a Modulation Coding Scheme, MCS, of the PUSCH. In some embodiments, the processing circuitry is further configured to insert one of zero and null symbols into coded UCI symbols to be mapped to the PUSCH. In some embodiments, UCI is transmitted on the PUSCH starting from a seventh symbol in time of the PUSCH and from a lowest physical resource block, PRB, index in frequency of the PUSCH, wherein a bit in the UCI indicates half subframe transmission for the PUSCH. In some embodiments, the uplink transmission is without an uplink grant from the base station.

According to yet another aspect, a method in a network node for receiving uplink control information, UCI, together with autonomous uplink, UL, data transmission is provided. The method includes receiving a physical uplink shared channel, PUSCH, signal, the PUSCH having the UCI, the UCI indicating at least one of a starting and ending position of the PUSCH. The method further includes performing decoding to detect at least one of: a symbol at which the PUSCH the UCI ends; and a symbol at which the PUSCH the UCI begins.

According to this aspect, in some embodiments, the decoding determines whether the UCI begins at one of symbol 0 and symbol 1 of the PUSCH. In some embodiments, the decoding determines whether the UCI ends at one of symbol 12 and symbol 13 of the PUSCH. In some embodiments the detection is performed by blind decoding. In other embodiments the UCI has a fixed starting and ending position, and it indicates the starting and ending position of the PUSCH so the gNB does not need to guess the position of PUSCH or UCI. In some embodiments, the method further includes requesting aperiodic channel state information, CSI, feedback, the aperiodic CSI feedback being requested when an ACK/NACK feedback message is sent.

According to yet another aspect a network node for receiving uplink control information, UCI, together with autonomous uplink, UL, data transmission, is provided. The network node includes processing circuitry including a memory and a processor. The memory is configured to store the UCI. The processor is configured to process a received physical uplink shared channel, PUSCH, signal, the PUSCH having the UCI, the UCI including at least one of a starting and ending position of the PUSCH, the processing including performing decoding to detect at least one of: at what symbol of the PUSCH the UCI ends; and at what symbol of the PUSCH the UCI begins.

According to this aspect, in some embodiments, the decoding determines whether the UCI begins at one of symbol 0 and symbol 1 of the PUSCH. In some embodiments, the decoding determines whether the UCI ends at one of symbol 12 and symbol 13 of the PUSCH. In some embodiments the detection is performed by blind decoding. In other embodiments the UCI has a fixed starting and ending position, and it indicates the starting and ending position of the PUSCH so the gNB does not need to guess the position of PUSCH or UCI. In some embodiments, the processor is further configured to request an aperiodic channel state information, CSI, feedback, the aperiodic CSI feedback being requested when an ACK/NACK feedback message is sent.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
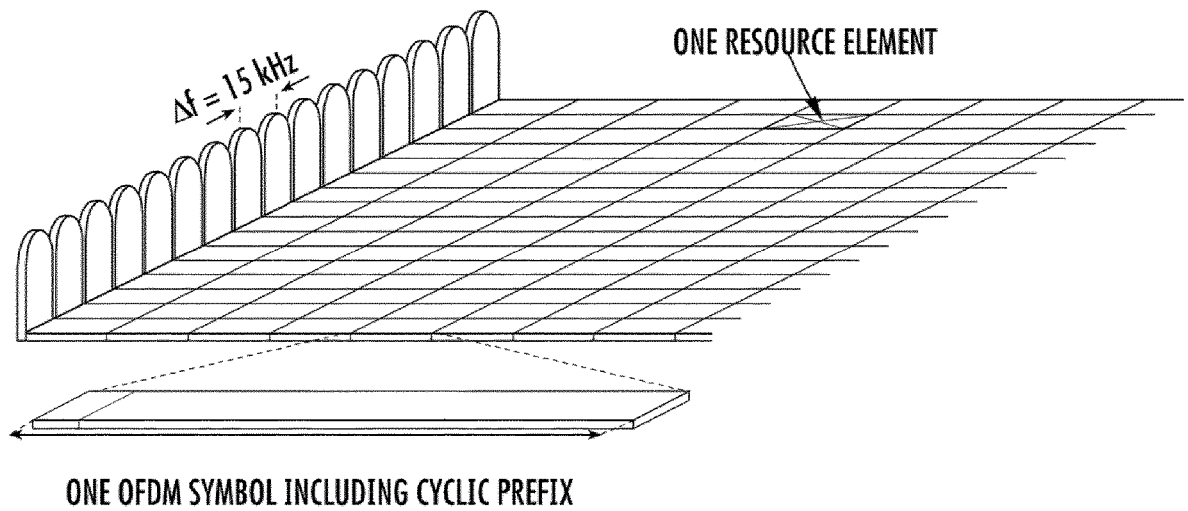
FIG. 1 is time frequency grid of downlink physical resources.
Figure 2:
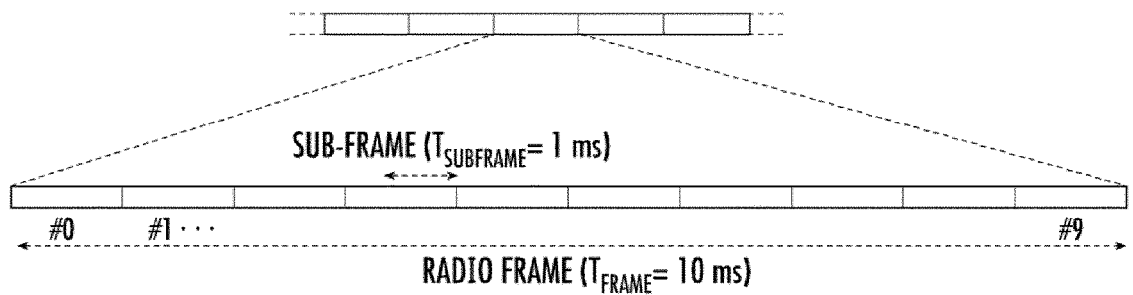
FIG. 2 is an illustration of frame timing.
Figure 3:
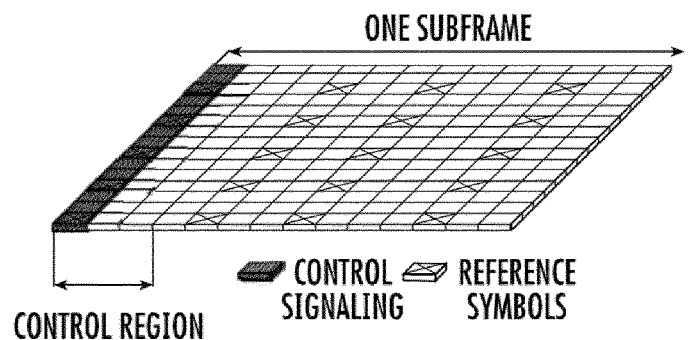
FIG. 3 is an illustration of reference symbols.
Figure 4:
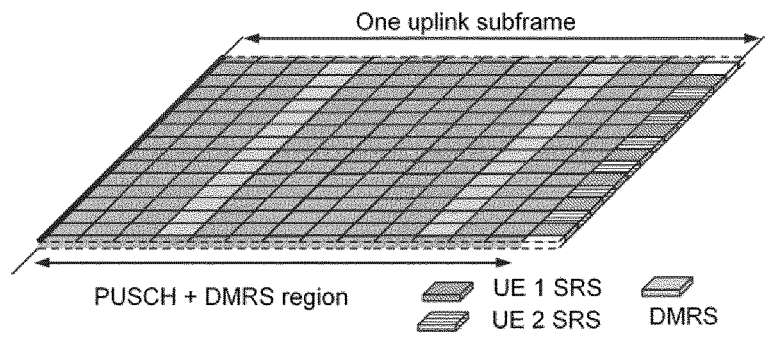
FIG. 4 is an uplink subframe.
Figure 5:
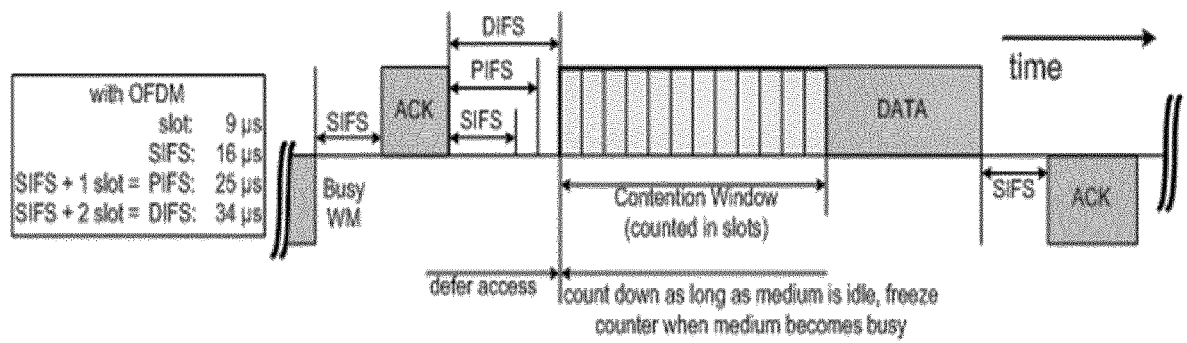
FIG. 5 is an illustration of listen before talk timing.
Figure 6:
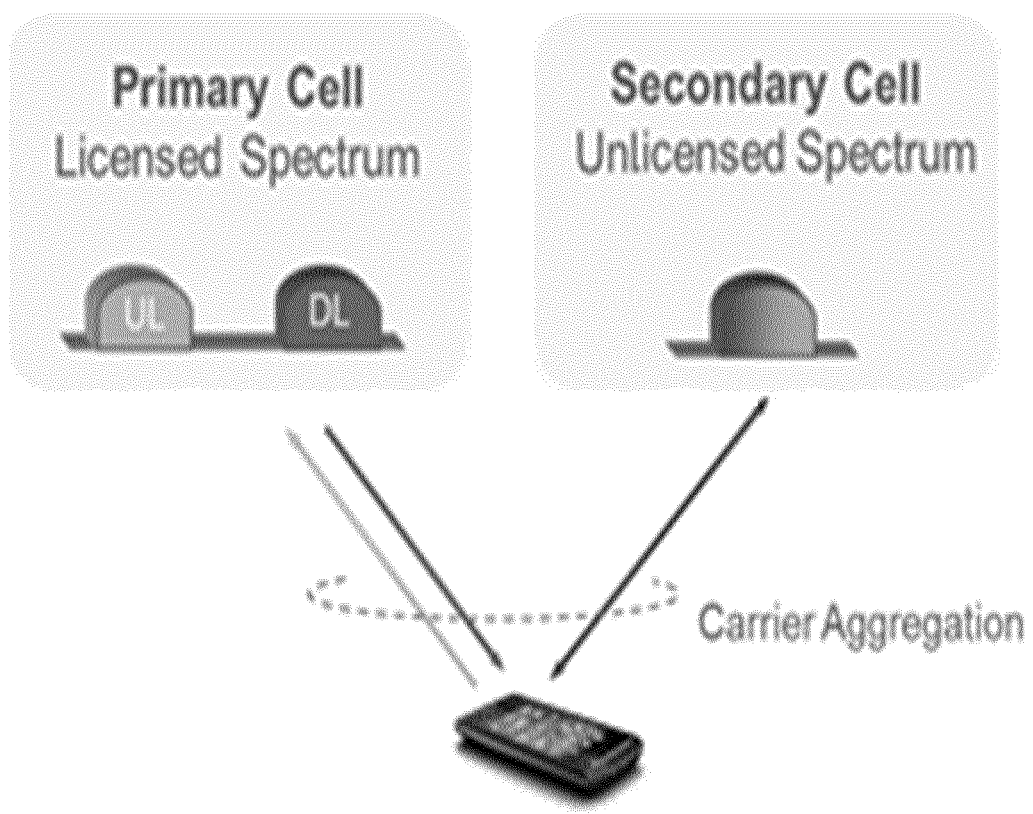
FIG. 6 a diagram of a wireless device connected to a PCELL and an SCELL.

Before describing in detail exemplary embodiments, it is noted that the embodiments reside primarily in combinations of apparatus components and processing steps related to uplink control signaling for unscheduled uplink access on an unlicensed cell. Accordingly, the apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Some embodiments can be implemented in multiple devices and network nodes able to perform scheduling and exchange information. The devices are capable of direct communication between devices (e.g., device to device communication). The network node herein can be the serving network node of the device or any network node with which the device can establish or maintain a communication link and/or receive information (e.g. via a broadcast channel).

The embodiments use a generic term 'network node' that may be any kind of network node. Examples are eNode B (eNB), gNB, Node B, Base Station, wireless access point (AP), base station controller, radio network controller, relay, donor node controlling relay, base transceiver station (BTS), transmission points, transmission nodes, RRU, RRH, nodes in distributed antenna system (DAS), core network node, MME etc.

Although terminology from 3GPP LTE-A (or E-UTRAN) has been used in this disclosure to exemplify the embodiments, this should not be viewed as limiting the scope of the disclosure to only the aforementioned system. Other wireless systems, including LTE, WCDMA, UTRA FDD, UTRA TDD, GSM/GERAN/EDGE and 5G New Radio (NR) may also benefit from exploiting the concepts covered within this disclosure.

Some of the problems associated with unscheduled uplink access on an unlicensed cell are addressed by embodiments disclosed herein. Transmitting uplink control information, UCI, autonomously in a licensed-assisted access, LAA, MulteFire or NR unlicensed (NR-U) access, said transmissions being without an UL grant from a base station enables the wireless device to transmit effectively and efficiently with an increased reception success and improved coexistence with other unlicensed wireless devices.

Figure 7:
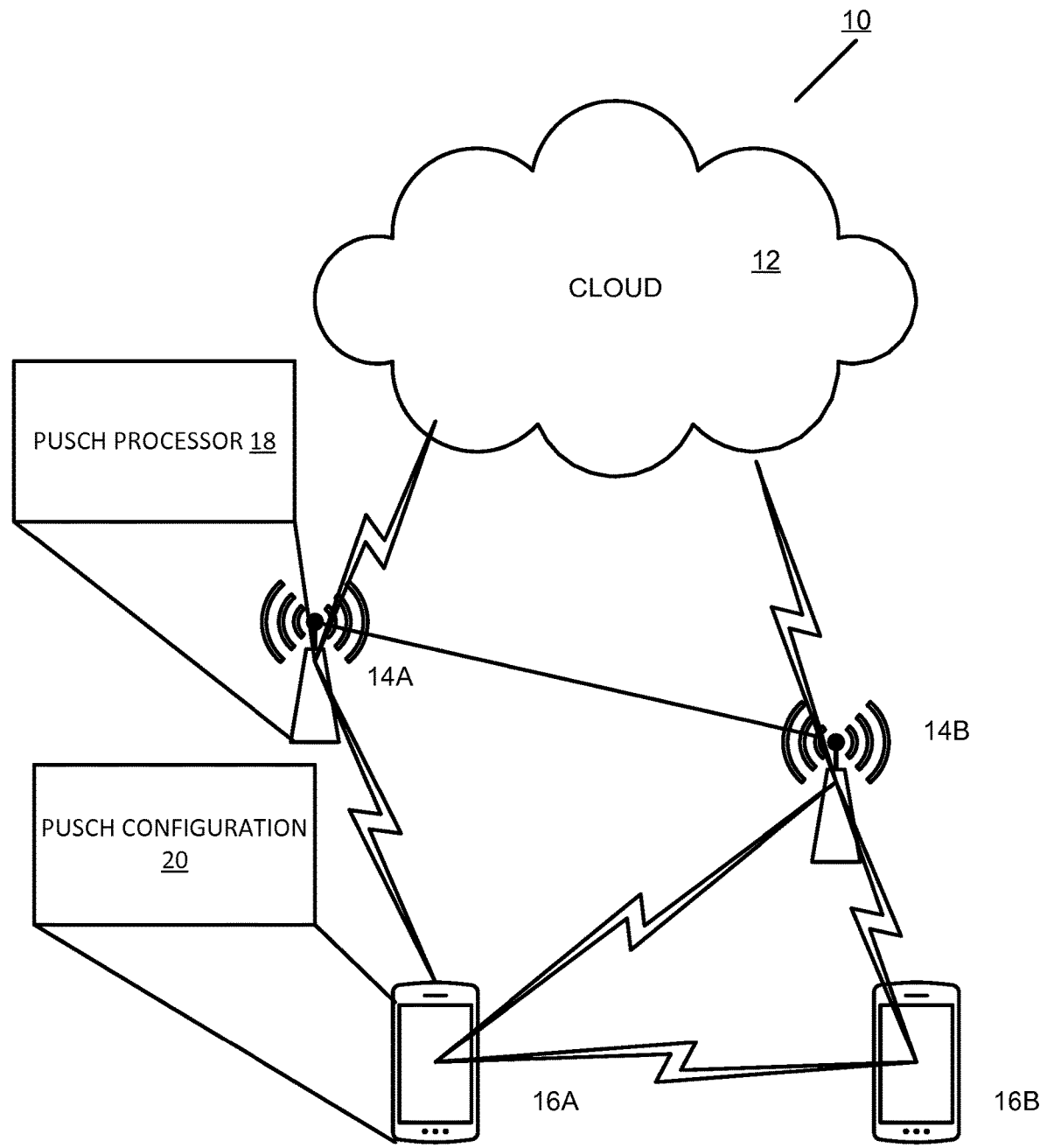
FIG. 7 is a block diagram of a wireless communication system constructed according to principles set forth herein.

Returning to the drawing figures, in which like elements are referred to by like reference numerals, there is shown in FIG. 7 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes such as network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, wireless devices 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 7, the network node 14 includes a PUSCH processor 18 configured to process a received physical uplink shared channel, PUSCH, signal, the PUSCH having the UCI, the UCI including at least one of a starting and ending position of the PUSCH, the processing including performing decoding to detect at least one of: at what symbol of the PUSCH the UCI ends; and at what symbol of the PUSCH the UCI begins. In some embodiments the detection is performed by blind decoding. In other embodiments the UCI has a fixed starting and ending position, and it indicates the starting and ending position of the PUSCH so the gNB does not need to guess the position of PUSCH or UCI.

Also as shown in FIG. 7, the wireless device 16 includes a PUSCH configuration module 20 configured to include in the UCI, at least one of a starting and ending position of a physical uplink shared channel, PUSCH; and map the UCI to time-frequency resources of the PUSCH.

Figure 8:
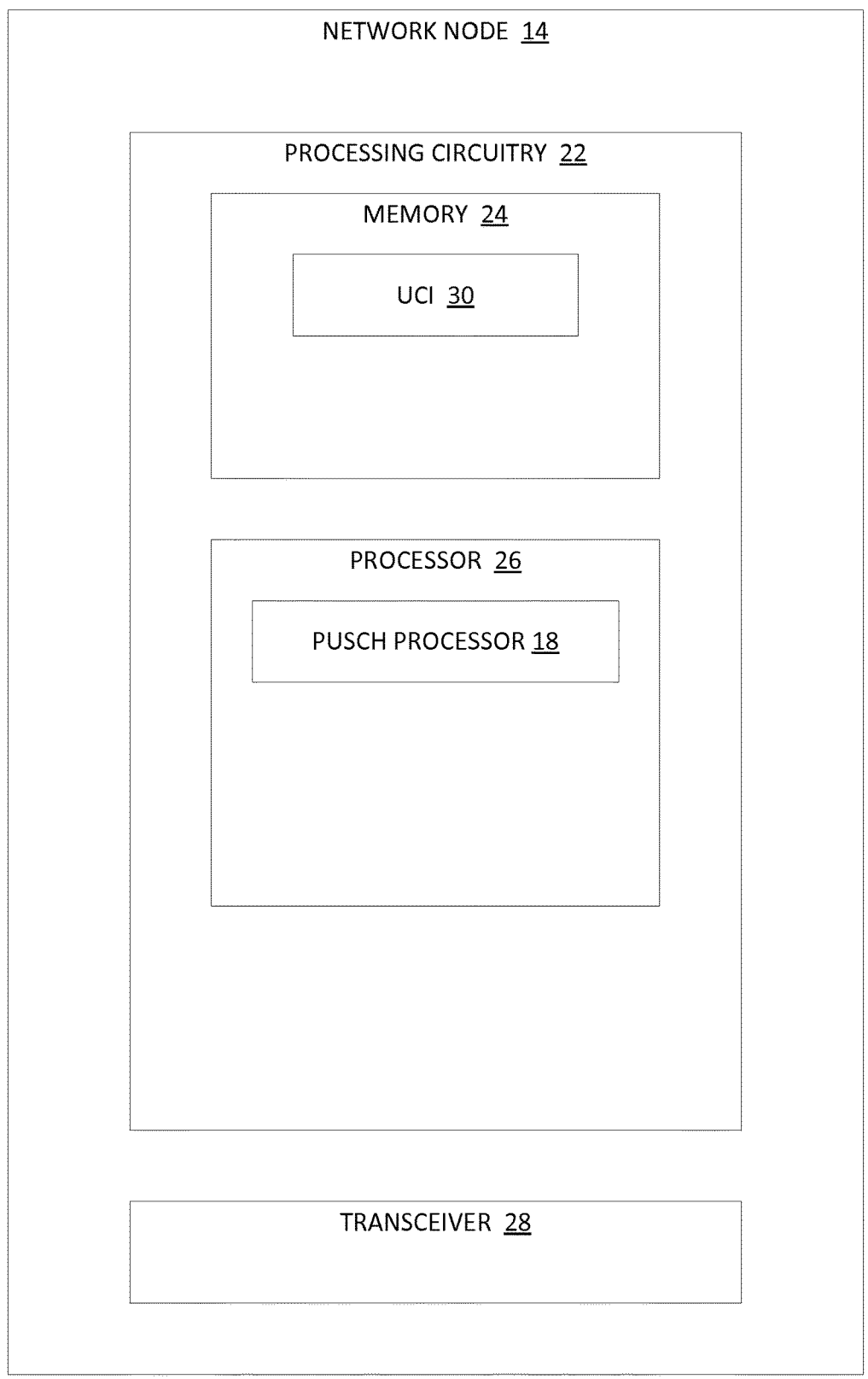
FIG. 8 is a block diagram of a network node constructed in accordance with principles set forth herein.

FIG. 8 is block diagram of a network node 14 constructed in accordance with principles set forth herein. The network node 14 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store UCI 30 received from a wireless device 16. The processor 26 is configured to implement a PUSCH processor 18 to process a received physical uplink shared channel, PUSCH, signal, the PUSCH having the UCI, the UCI including at least one of a starting and ending position of the PUSCH, the processing including performing decoding to detect at least one of: at what symbol of the PUSCH the UCI ends; and at what symbol of the PUSCH the UCI begins. A transceiver 28 is configured to receive the PUSCH from a wireless device 16. In some embodiments the detection is performed by blind decoding. In other embodiments the UCI has a fixed starting and ending position, and it indicates the starting and ending position of the PUSCH so the gNB does not need to guess the position of PUSCH or UCI.

Figure 9:
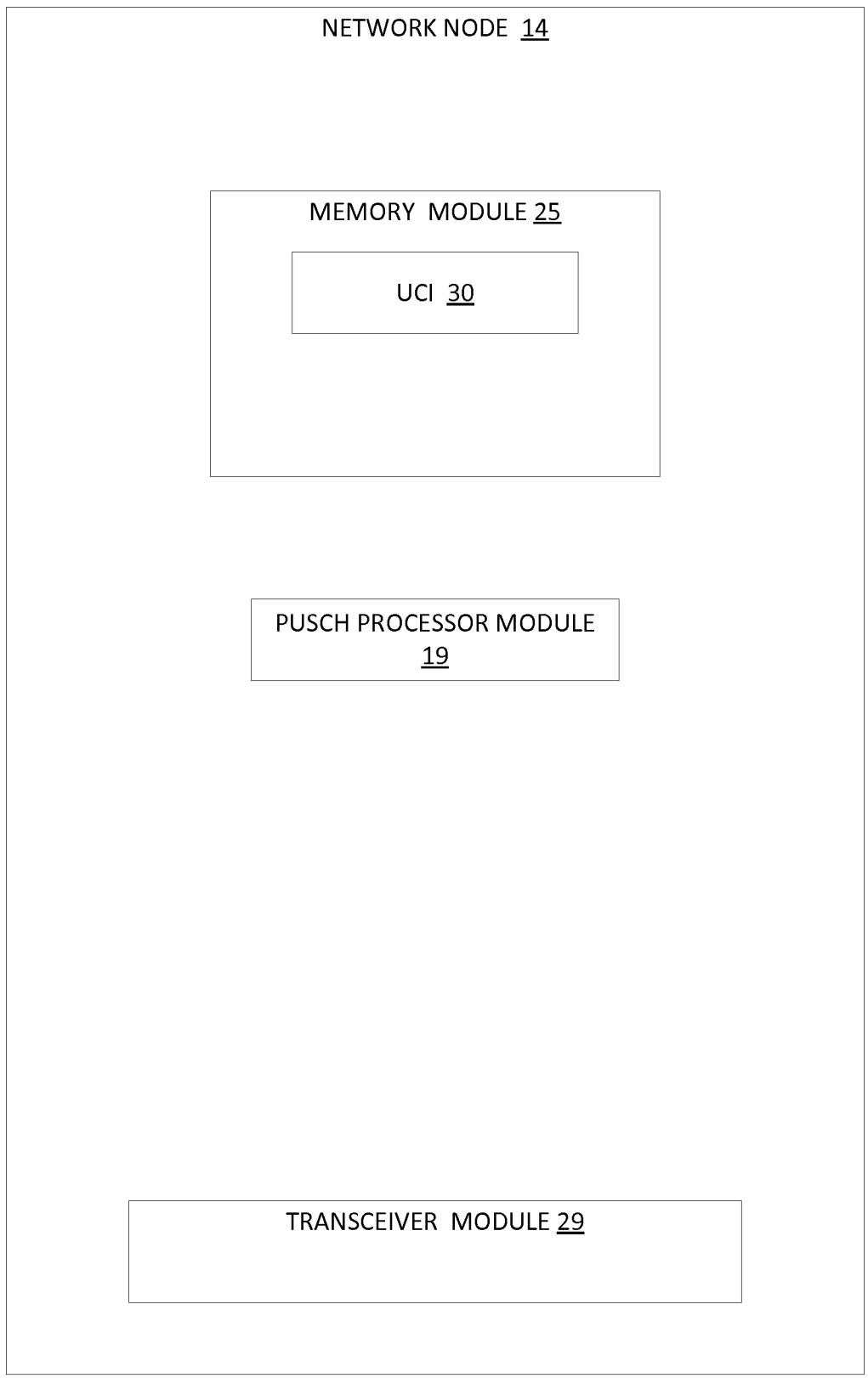
FIG. 9 is a block diagram of an alternative embodiment of a network node constructed in accordance with principles set forth herein.

FIG. 9 is a block diagram of an alternative embodiment of a network node 14 constructed in accordance with principles set forth herein. A memory module 25 stores the UCI 30. A PUSCH processor module 19 may be software that, when executed by a processor, causes the processor to process a received physical uplink shared channel, PUSCH, signal.

The transceiver module 29 is configured to receive the PUSCH from a wireless device 16.

Figure 10:
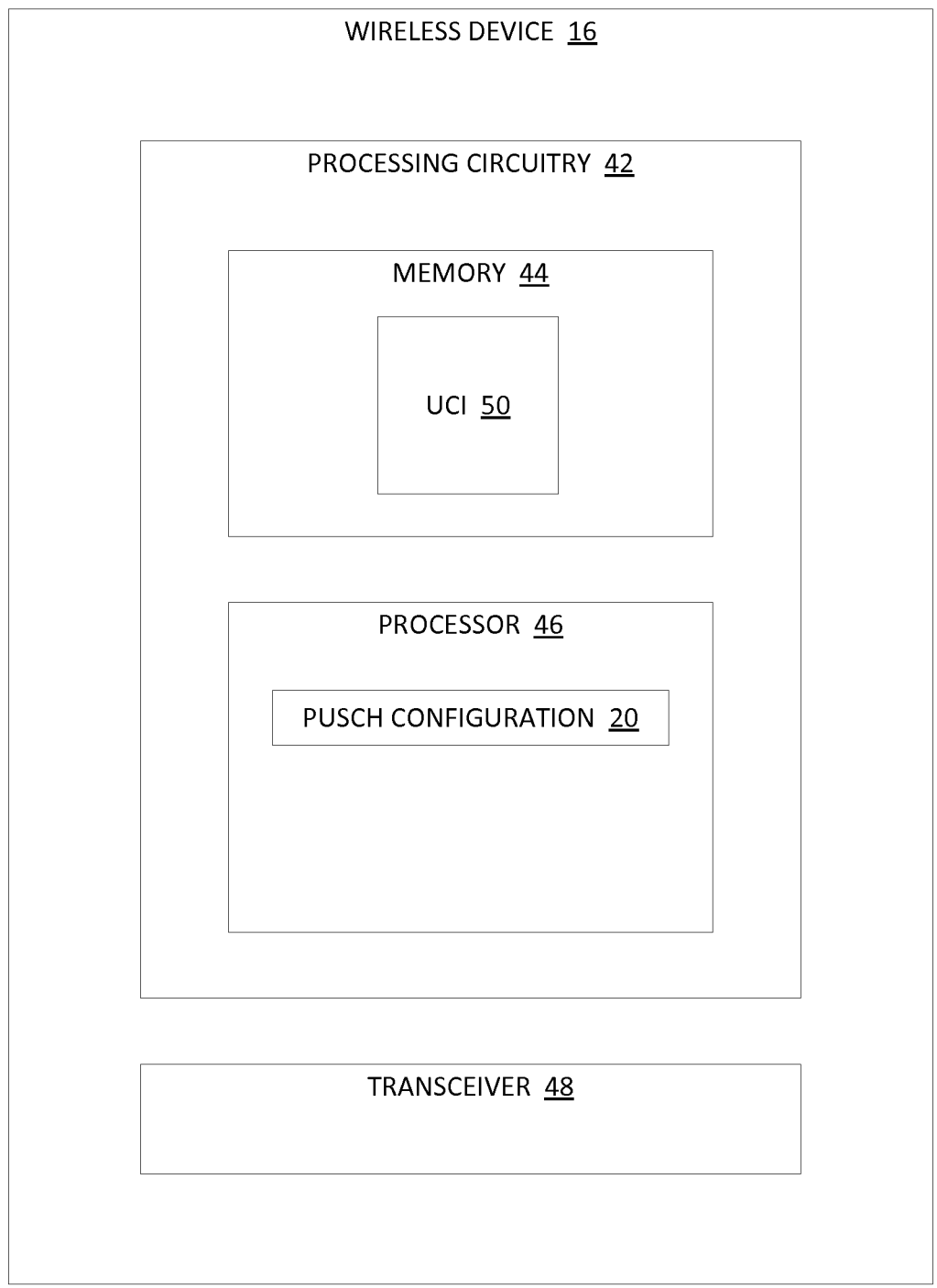
FIG. 10 is a block diagram of a wireless device constructed in accordance with principles set forth herein.

FIG. 10 is a block diagram of a wireless device 16 constructed in accordance with principles set forth herein. The wireless device 16 includes processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store UCI 50 to be transmitted to a network node 14. The processor 46 is configured to implement a PUSCH configuration unit 20 configured to include in the UCI, at least one of a starting and ending position of a physical uplink shared channel, PUSCH; and map the UCI to time-frequency resources of the PUSCH. The transceiver 48 transmits the PUSCH to the network node 14.

Figure 11:
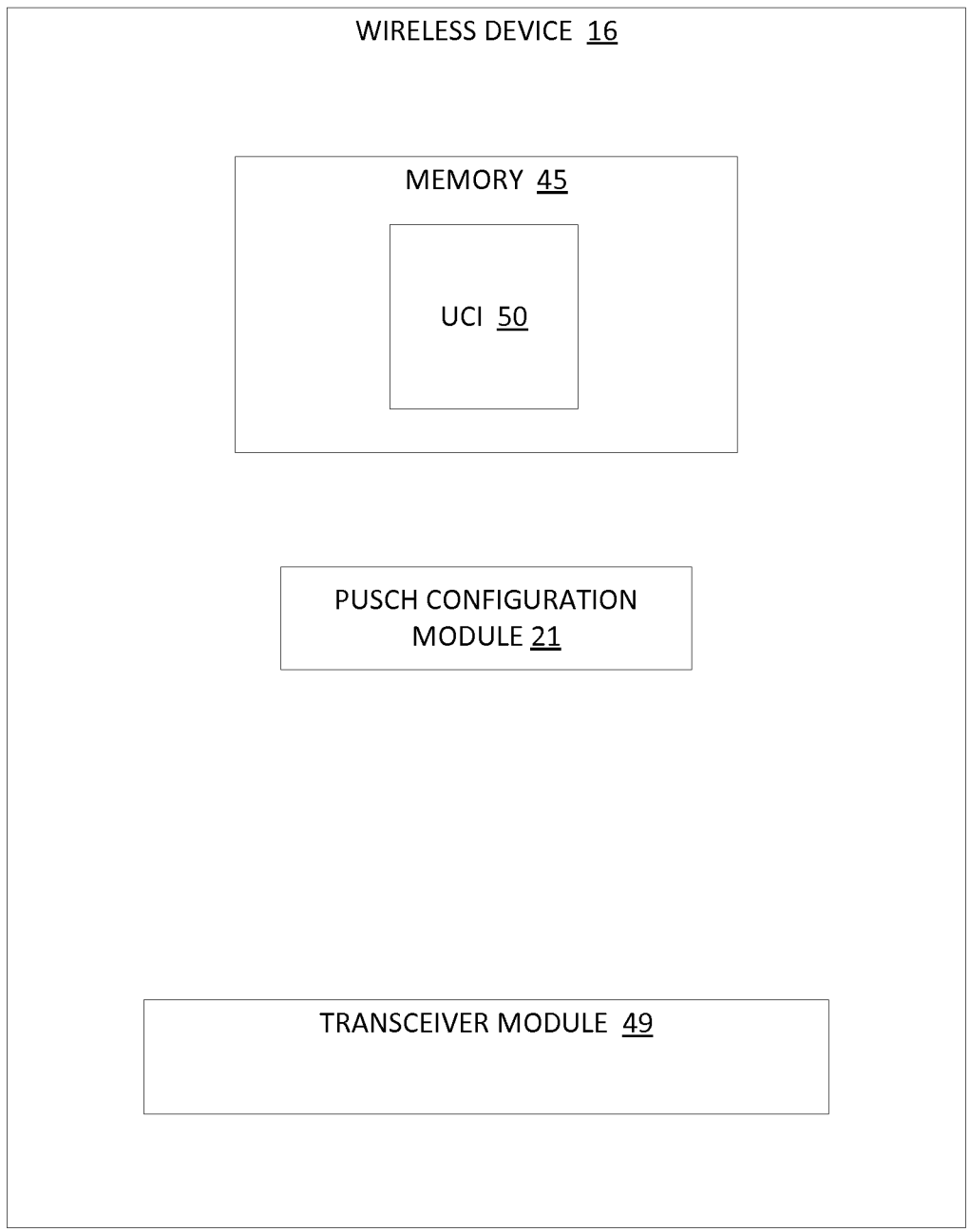
FIG. 11 is block diagram of an alternative embodiment of a wireless device constructed in accordance with principles set forth herein.

FIG. 11 is a block diagram of an alternative embodiment of a wireless device 16 constructed in accordance with principles set forth herein. The memory module 45 is configured to store UCI 50. The PUSCH configuration module 21 may include software that, when executed by a processor, causes the processor to include in the UCI, at least one of a starting and ending position of a physical uplink shared channel, PUSCH; and map the UCI to time-frequency resources of the PUSCH. The transceiver 49 transmits the PUSCH to the network node 14.

Figure 12:
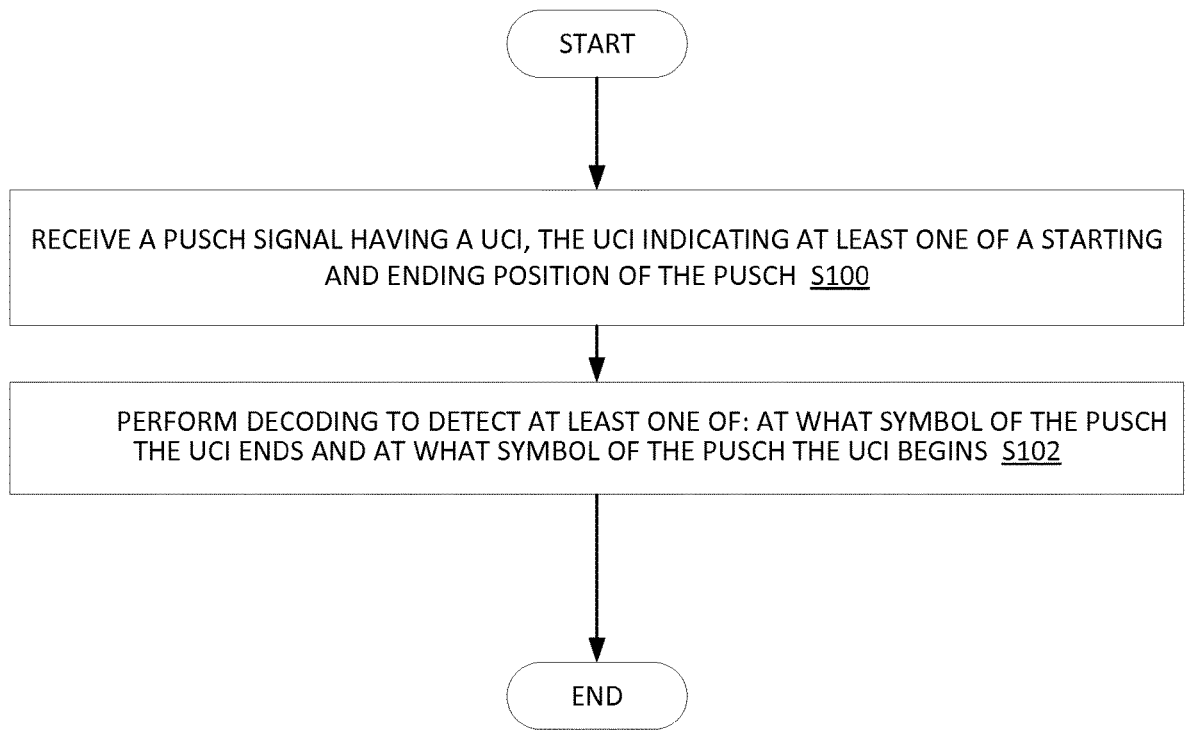
FIG. 12 is a flowchart of an exemplary process in a network node for receiving uplink control information, UCI, autonomously transmitted by a wireless device in a licensed-assisted access, LAA, communication system.

FIG. 12 is a flowchart of an exemplary process in a network node 14 for receiving uplink control information, UCI, autonomously transmitted by a wireless device in a licensed-assisted access, LAA, communication system. The process includes receiving, via transceiver 28, a PUSCH signal having a UCI, the UCI indicating at least one of a starting and ending position of the PUSCH (block S100). The process also includes performing, via processor 18, decoding to detect at least one of at what symbol of the PUSCH the UCI ends and at what symbol of the PUSCH the UCI begins (S102). In some embodiments the detection is performed by blind decoding. In other embodiments the UCI has a fixed starting and ending position, and it indicates the starting and ending position of the PUSCH so the gNB does not need to guess the position of PUSCH or UCI.

Figure 13:
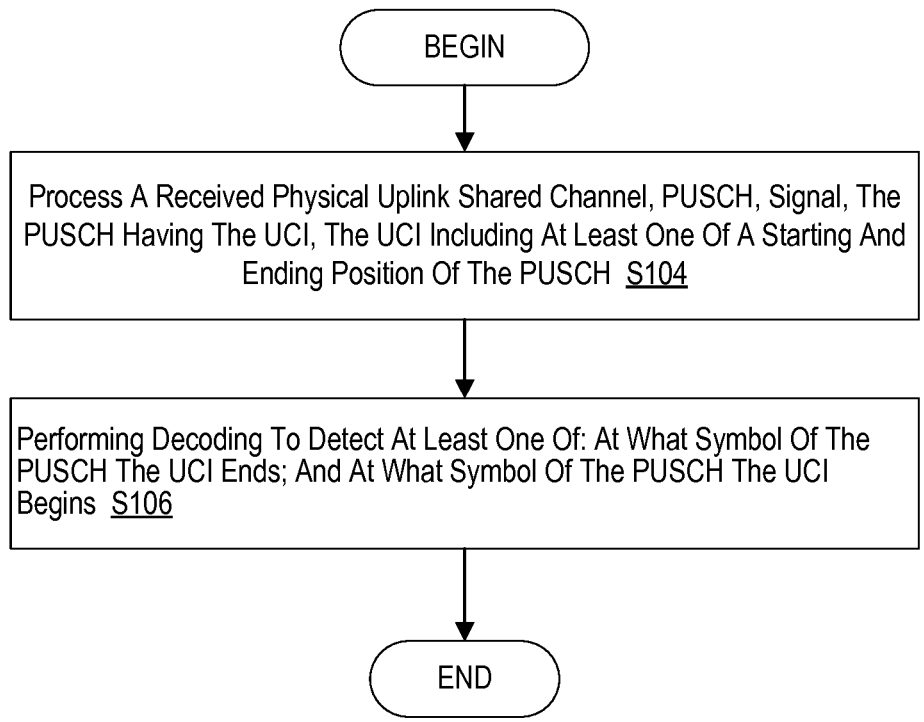
FIG. 13 is a flowchart of an exemplary process in a network node for processing a PUSCH having UCI.

FIG. 13 is a flowchart of an exemplary process in a network node 14 for processing a PUSCH having UCI. The process includes processing via PUSCH processor unit 18, a physical uplink shared channel, PUSCH, signal, the PUSCH having the UCI, the UCI indicating at least one of a starting and ending position of the PUSCH (block 104). The process also includes performing, via the PUSCH processor unit 18, decoding to detect at least one of: at what symbol of the PUSCH the UCI ends; and at what symbol of the PUSCH the UCI begins (block 106). In some embodiments the detection is performed by blind decoding. In other embodiments the UCI has a fixed starting and ending position, and it indicates the starting and ending position of the PUSCH so the gNB does not need to guess the position of PUSCH or UCI.

Figure 14:
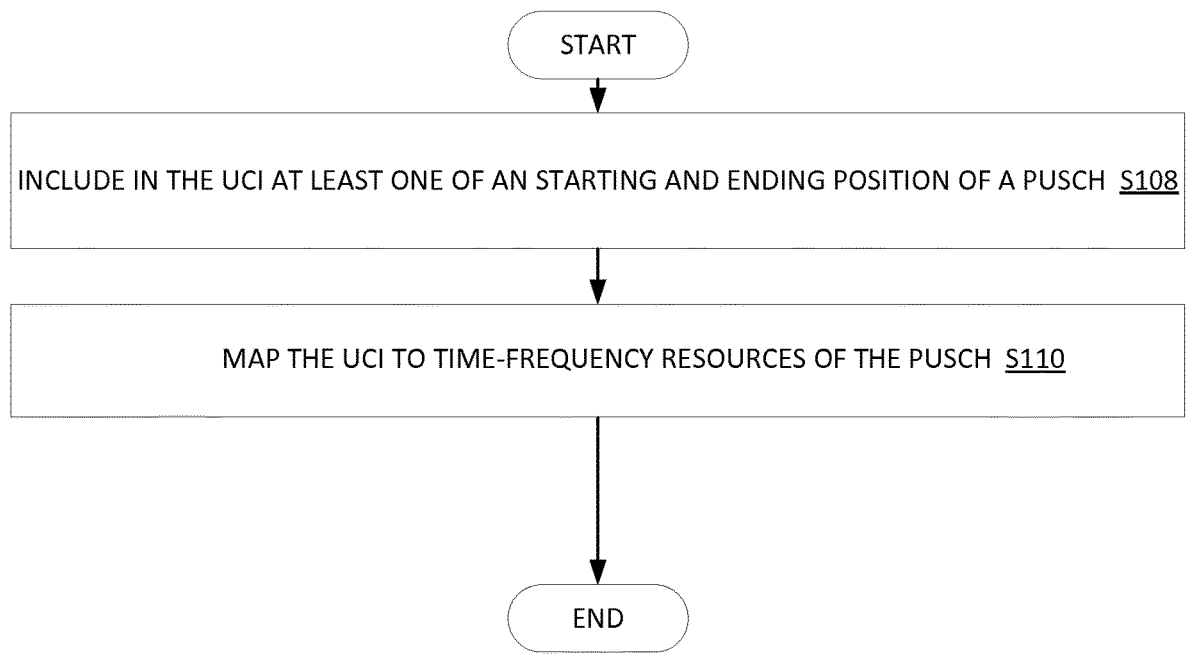
FIG. 14 is a flowchart of an exemplary process in a wireless device for mapping the UCI to the PUSCH.

FIG. 14 is a flowchart of an exemplary process in a wireless device for mapping the UCI to the PUSCH. The process includes including, via processor 46, in the UCI at least one of a starting and ending position of the PUSCH (block S108). The process also includes mapping, via PUSCH configuration unit 20, the UCI to time-frequency resources of the PUSCH (block S110)

Figure 15:
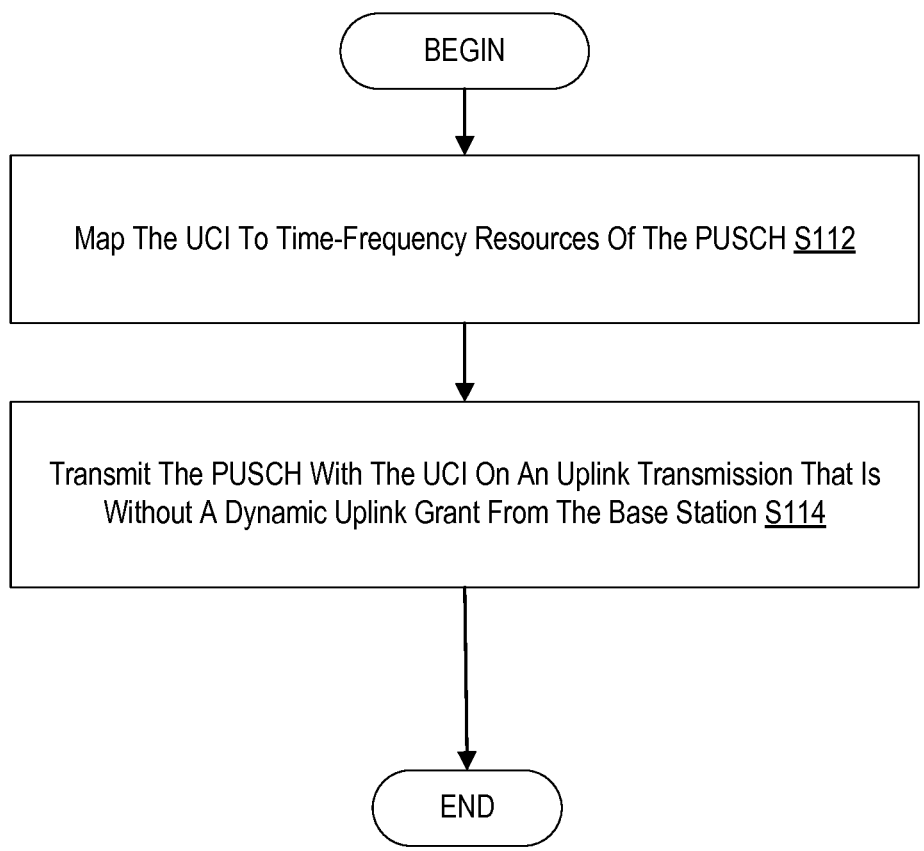
FIG. 15 is a flowchart of an exemplary process in a wireless device for autonomously transmitting uplink control information, UCI, in a licensed-assisted access, LAA, communication system.

FIG. 15 is a flowchart of an exemplary process in a wireless device 16 for autonomously transmitting uplink control information, UCI, in a licensed-assisted access, LAA, communication system. The process includes mapping, via the PUSCH configuration unit 20, the UCI to time frequency resources of the PUSCH (block S112). The process also includes transmitting the PUSCH with the UCI on an uplink transmission, the uplink transmission being without a dynamic uplink grant from the base station (block S114). Note that a semi-persistent grant can be overridden by a dynamic grant. Therefore a semi-persistent grant does not exclude dynamic grants but it is, itself a non-dynamic grant.

Having described the general process flow of arrangements of the disclosure and having provided examples of hardware and software arrangements for implementing the processes and functions of the disclosure, the sections below provide details and examples of arrangements for unscheduled uplink access on an unlicensed wireless communication network cell.

UCI Parameters

If a wireless device is transmitting autonomous UL, the wireless device should at least include at least some of the following parameters in an UL control information (UCI) signal in the uplink transmission for every PUSCH transmission:

LBT priority class (2 bits);

Number of subframes reserved for UL (2 bits);

PUSCH starting position, which indicates the PUSCH starting symbol. In one embodiment, the PUSCH always starts at a subframe boundary, i.e., symbol 0 and hence, this signaling in UCI is not needed. In another embodiment, the first PUSCH subframe in a transmission burst can start at symbol 0 or 1 according to network node signaling for the purpose of UL LBT. One bit is included in the UCI to indicate whether the PUSCH for this subframe starts at symbol 0 or symbol 1;

PUSCH ending position: in one example, this bit indicates if the PUSCH on the current subframe is shortened or not, i.e., PUSCH ends at symbol 12 or 13. In another example, the PUSCH ending position indicates if PUSCH on a next subframe is shortened.

UCI Channel Coding and Modulation

New UCI is denoted as $o_0, o_1, o_2, \ldots, o_{O-1}$, where O is the number of UCI bits. New UCI is input to a CRC attachment for robustness. In one example, 8-bit CRC (Cyclic Redundancy Check) is appended and scrambled with the shortened wireless device C-RNTI (8 bits) to identify the transmitting wireless device. In another example, a 16-bit CRC is appended and scrambled with the 16-bit wireless device C-RNTI to identify the transmitting wireless device.

Tail-biting Convolutional code (TBCC) is applied as a coding scheme for a new UCI. In one example, the modulation order of the UCI is the same as PUSCH data. In another example, quadrature phase shift keying (QPSK) may always be applied for UCI modulation.

A beta offset is used to account for different block error rate (BLER) targets and encoding schemes of UCI and PUSCH data. In one example, a radio resource control (RRC)-configured beta offset, e.g., a 4-bit beta offset, is used and the mapping of offset values and index reuses an existing HARQ-ACK offset mapping table. In another example, a fixed/predefined beta offset is used.

The number of coded modulation symbols is determined at least by the size of the new UCI, the effective coding rate of the PUSCH and the beta offset to account for a specified performance difference between the PUSCH and the new UCI. The effective coding rate of the PUSCH can be determined by the MCS of the PUSCH. Alternatively, the effective coding rate of the PUSCH can be determined by the ratio of the transport block size and the number of coded PUSCH bits.

According to a first embodiment, the number of coded UCI symbols per layer is calculated as $$Q' = \min\left(\left\lceil \frac{(O+L) \cdot M_{sc}^{PUSCH(x)} \cdot N_{symb}^{PUSCH(x)} \cdot \beta_{offset}^{UCI}}{\sum_{r=0}^{C^{(x)}-1} K_r^{(x)}} \right\rceil, M_{sc}^{PUSCH(x)} \cdot N_{symb}^{PUSCH}\right)$$

where

O is the number of UCI bits,

L is the number of CRC bits, and $\beta_{offset}^{UCI}$ is the configured or predefined UCI beta offset.

$K_r^{(x)}$ is the number of bits for code block number r, and $C^{(x)}$ is the number of code blocks. The variable "x" in $K_r^{(x)}$ represents the transport block index corresponding to the highest $I_{MCS}$ value.

$M_{sc}^{PUSCH(x)}$ is the scheduled bandwidth for PUSCH transmission in the current sub-frame for the transport block.

$N_{symb}^{PUSCH(x)}$ is the number of SC-FDMA symbols in the current PUSCH transmission sub-frame used for UCI transmission. In one example, $N_{symb}^{PUSCH(x)}$ is 12. In another example, $N_{symb}^{PUSCH(x)}$ depends on the configured PUSCH starting and ending positions. The value of $N_{symb}^{PUSCH(x)}$ for different configurations are illustrated in Table 1.

TABLE 1

| | Value of $N_{symb}^{PUSCH(x)}$ | |
|---|---|---|
| OS | | PUSCH starting |
| PUSCH ending OS | {0} | {0, 1} |
| {13} | 12 | 11 |
| {12, 13} | 11 | 10 |

The modulation coded symbols of UCI per layer $q_0, q_1, q_2, q_3, \ldots q_Q$ are then input to UCI resource element (RE) mapping.

According to a second embodiment, the number of coded UCI symbols is read from a look-up table based on at least the MCS of the PUSCH. This embodiment is particularly advantageous when the size of the new UCI is known. This size is either defined in the specifications or is fixed based on higher-layer configuration by the network node 14.

As a further simplification, a look-up table can be defined to map several MCS values to the same number of coded UCI symbols.

Furthermore, the number of coded UCI symbols can be configured by the network node via higher layer signaling. The same number of coded UCI symbols is then used by the wireless device 16 for all autonomous UL transmissions.

UCI RE Mapping

Case 1: Same as A-CSI

Figure 16:
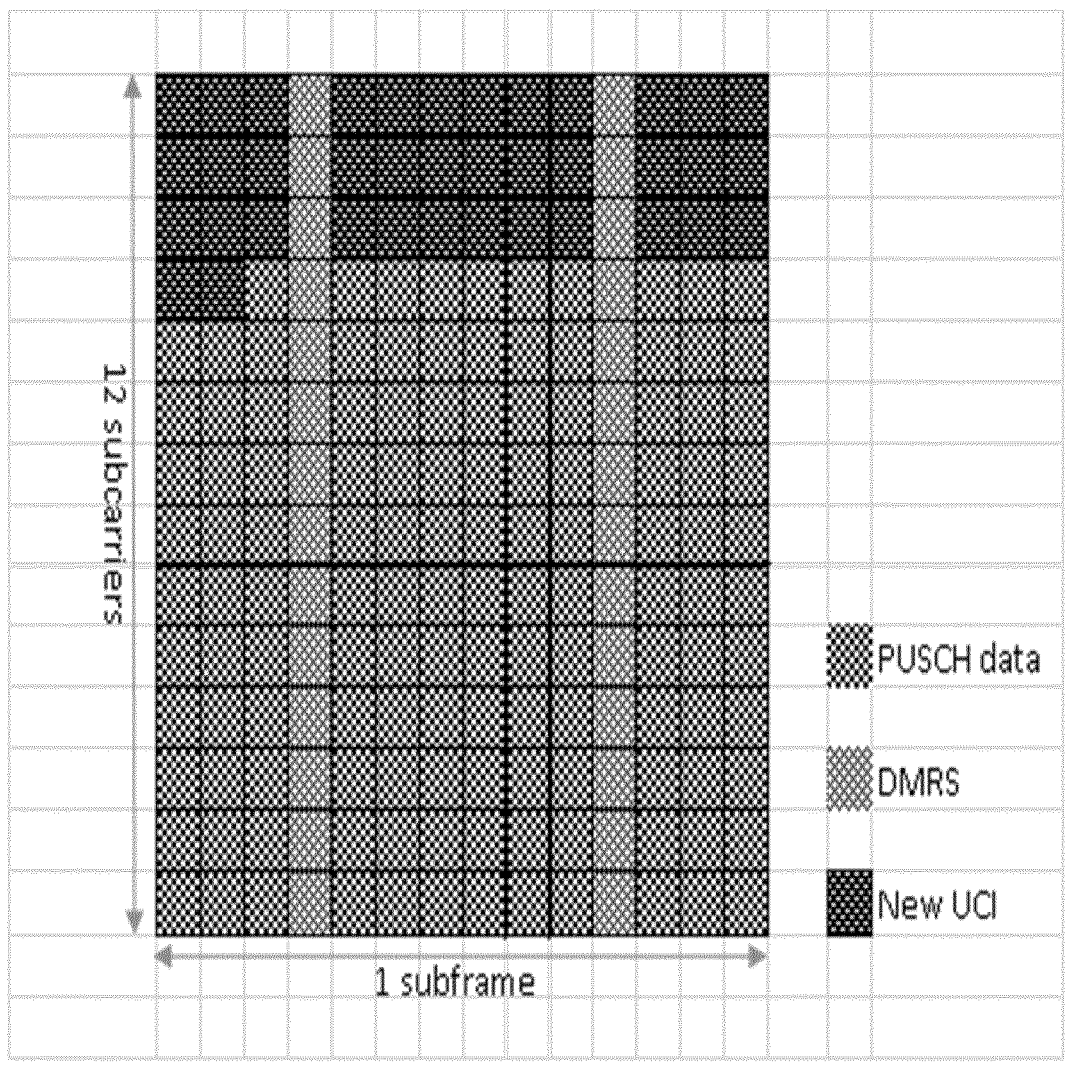
FIG. 16 is an embodiment of mapping UCI and DMRS on time frequency resources.

In a first embodiment, UCI is mapped on time-frequency resources in a similar way as traditional aperiodic channel state information (CSI) on the PUSCH starting from the lowest physical resource block (PRB) index of the allocated PUSCH transmission, as shown in FIG. 16.

Case 2 PUSCH Starting on Symbol 0 or 1

Figure 17:
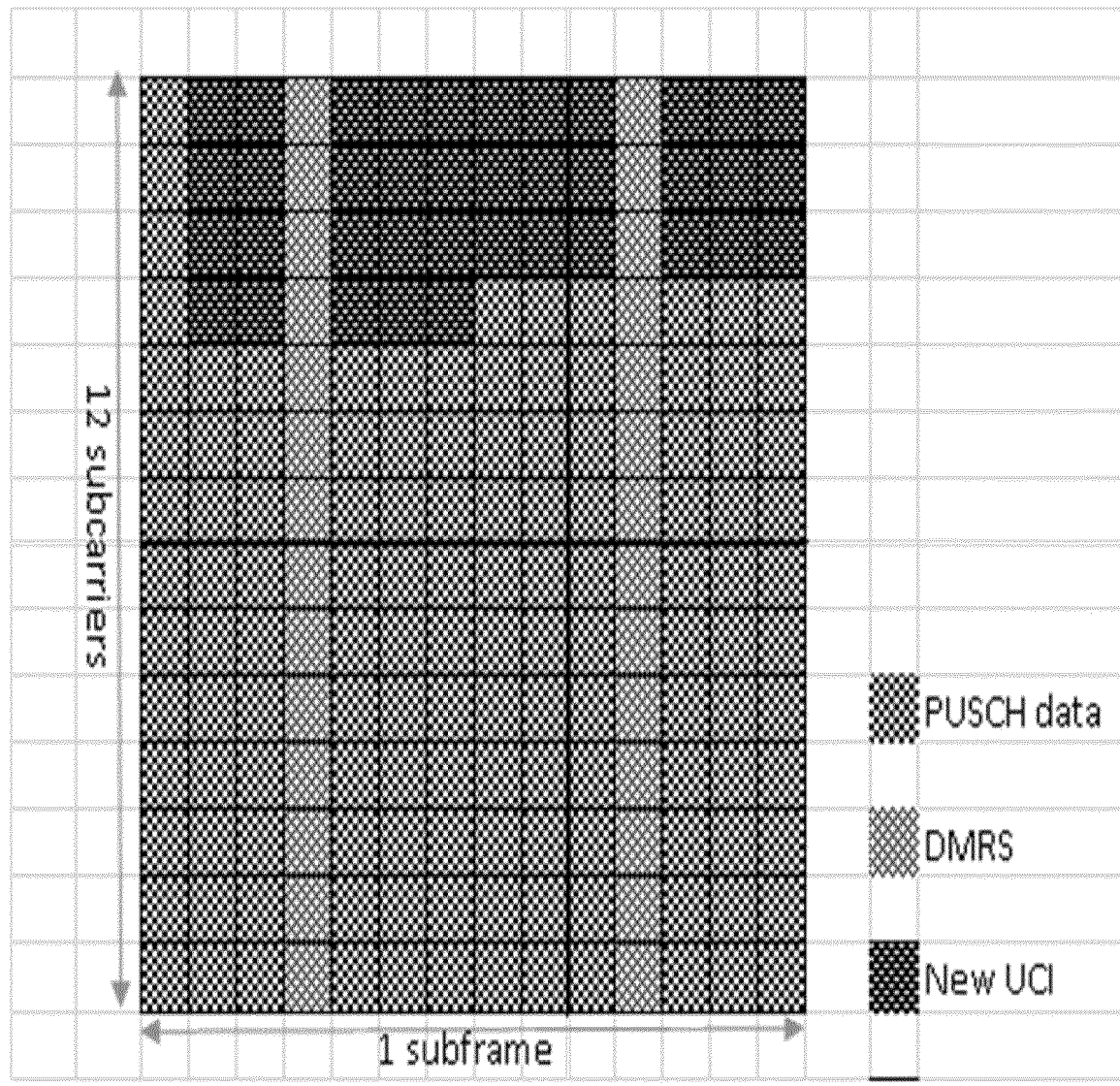
FIG. 17 is another embodiment of mapping UCI starting on symbol 1 and DMRS on time frequency resources.

In a second embodiment, if the PUSCH transmission starting on symbol 0 and 1 is supported, the UCI is placed on the PUSCH starting from the lowest PRB index of the allocated PUSCH transmission in frequency and starting from symbol 1 in time, as shown in FIG. 17. The same UCI mapping is applied for all autonomous UL PUSCH. In this case, PUSCH starting position for each subframe is indicated in the corresponding UCI.

Alternatively, below UCI RE mapping only applies for the first subframe in a UL burst, if PUSCH transmission starting on symbol 0 and 1 is supported. In the latter case, the network node 14 has to do blind decoding to detect whether UCI starts at symbol 0 or 1 for each subframe. After correctly detecting UCI, the network node 14 becomes aware of the PUSCH starting position that follows the same starting position as UCI.

Case 3: Shortened PUSCH

Figure 18:
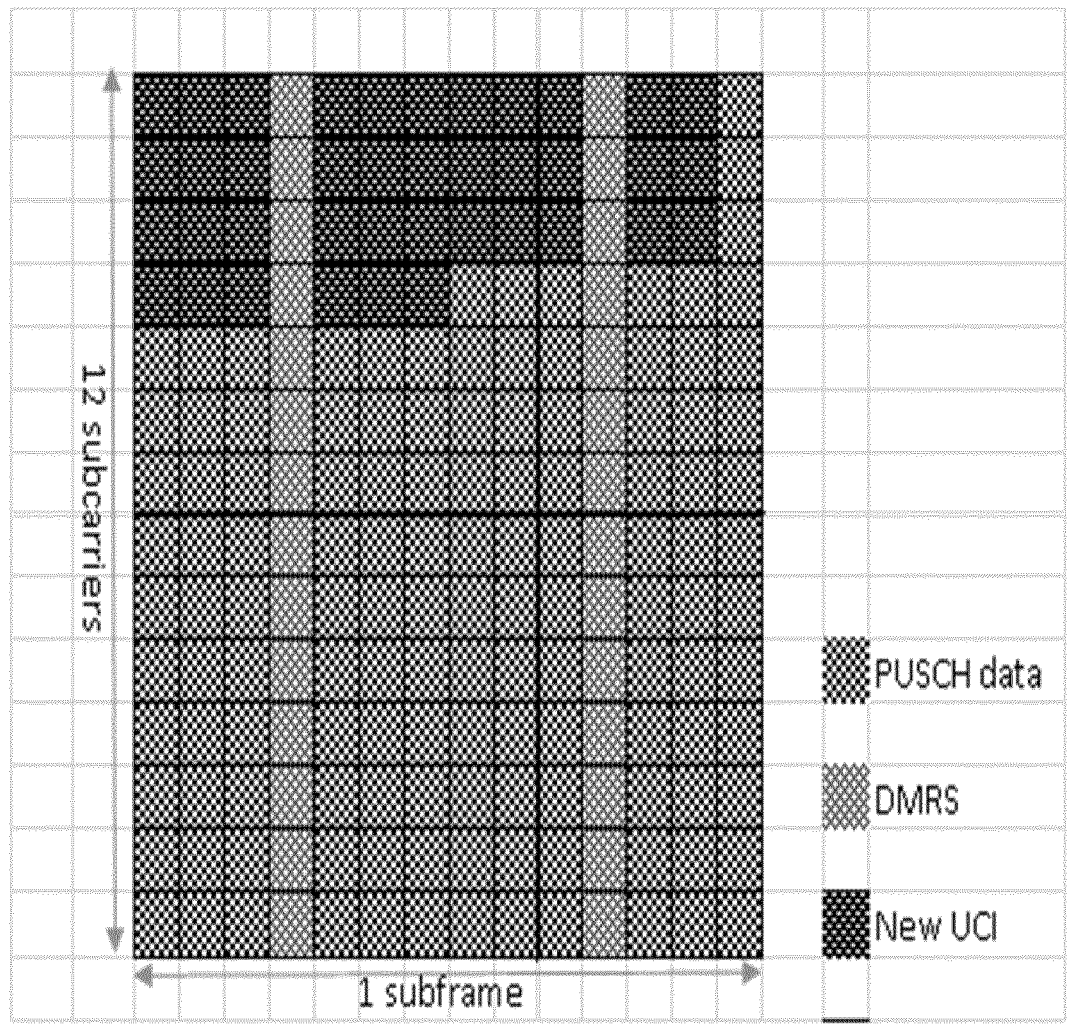
FIG. 18 is another embodiment of mapping UCI ending on symbol 12 and DMRS on time frequency resources.

In a third embodiment, if PUSCH transmission always starts from a subframe boundary and a shortened PUSCH is supported (i.e., ends on symbol 12 or 13), the UCI is mapped on time-frequency resources in a similar way as traditional aperiodic CSI on PUSCH starting from the lowest PRB index of the allocated PUSCH transmission, but not on the last symbol, as shown in FIG. 18. The same UCI mapping is applied for all autonomous UL PUSCH. In this case, the PUSCH ending position for each subframe is indicated in the corresponding UCI. Or, alternatively, this mapping is only applied in the subframe where the PUSCH is shortened. The network node 14 may have to perform blind decoding to detect whether UCI ends at symbol 12 or 13 for each subframe. After correctly detecting UCI, the network node 14 becomes aware of the PUSCH ending position that follows the same ending position as UCI.

Case 4: PUSCH Starting on Symbol 0 or 1 and Shortened PUSCH

Figure 19:
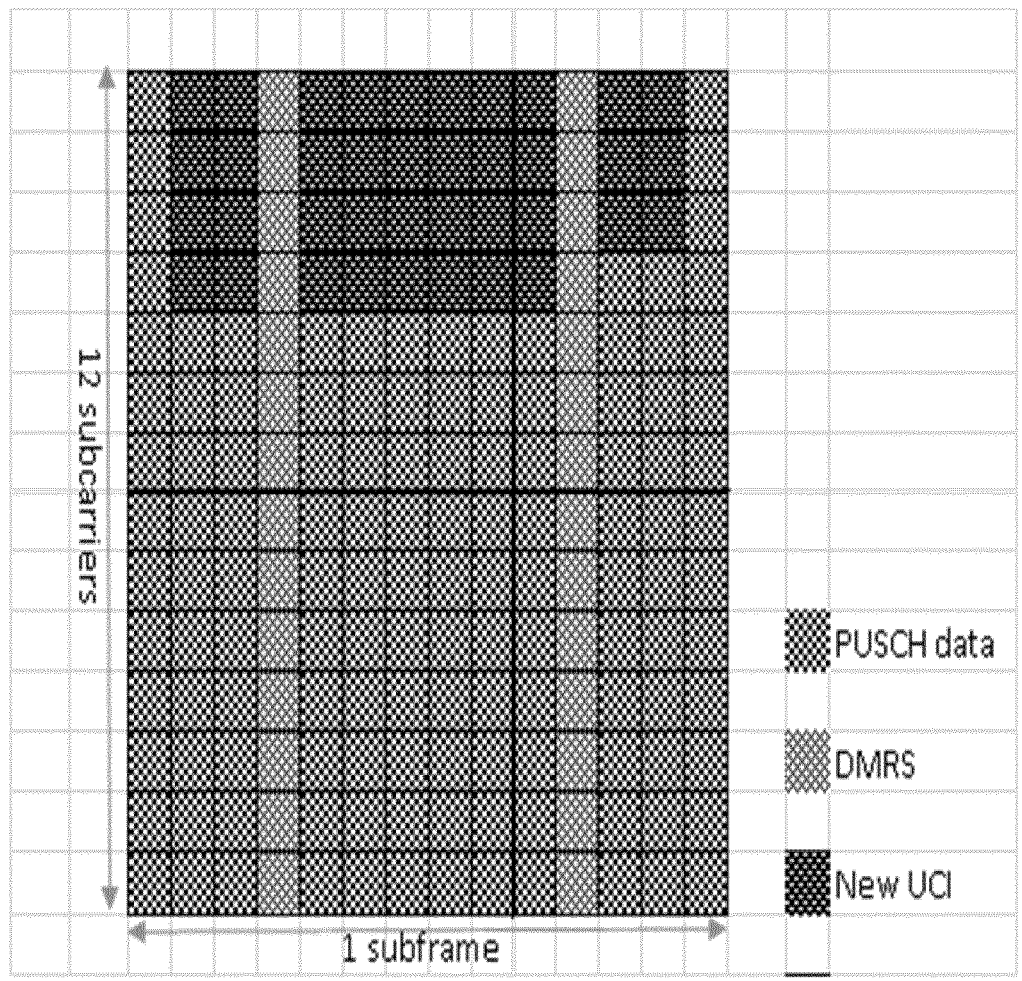
FIG. 19 is another embodiment of mapping UCI starting on symbol 1 and ending on symbol 12 and DMRS on time frequency resources.

In a fourth embodiment, if PUSCH transmission starting on symbol 0 and 1 is supported and shortened PUSCH is supported (i.e., ends on symbol 12 or 13), UCI is mapped on time-frequency resources in a similar way as traditional aperiodic CSI on PUSCH starting from lowest PRB index of allocated PUSCH transmission, but not on the first and last symbol, as shown in FIG. 19.

The same UCI mapping is applied for all autonomous UL PUSCH. In this case, the PUSCH starting and ending position for each subframe is indicated in the corresponding UCI. Or, alternatively, this mapping is only applied in the subframe where the PUSCH starts on symbol 1 and is shortened. The network node 14 may perform blind decoding to detect whether UCI:

starts at symbol 0 and finishes at symbol 13;
starts at symbol 0 and finishes at symbol 12;
starts at symbol 1 and finishes at symbol 13;
starts at symbol 1 and finishes at symbol 12.

After correctly detecting the UCI, the network node 14 becomes aware of the PUSCH ending position that follows the same ending position as the UCI.

Null/Zero Symbol Insertion

In some embodiments described above, additional changes to the channel interleaver are needed to be able to write data symbols into the resource elements left unused by the UCI in the first and/or last OFDM symbols (e.g., the top 3 resource elements in the last OFDM symbol as illustrated for embodiment 3).

Figure 20:
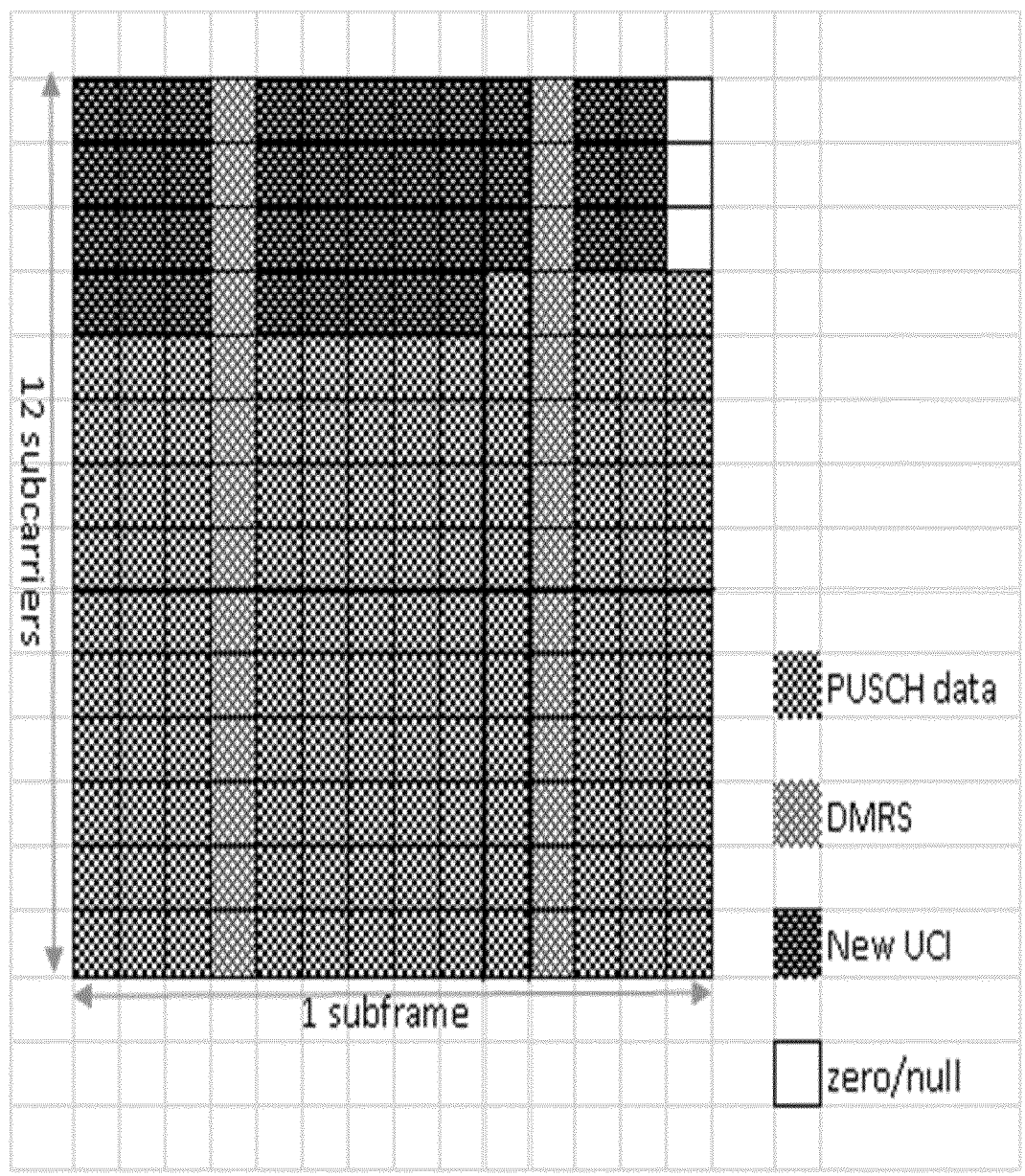
FIG. 20 is another embodiment of mapping UCI and DMRS on time frequency resources where UCI is not encoded on the last OFDM symbol.

Such changes to the channel interleaver may be undesirable since the low-level (possibly hardware) implementation in the wireless device 16 needs to be modified accordingly. To avoid this, a fifth embodiment is proposed that insert zero or null symbols into the coded UCI symbols such that the resource elements in the last OFDM symbol of the coded UCI region do not carry UCI or data. This is illustrated in the following in FIG. 20.

In one non-limiting implementation of this embodiment, the number of zero or null symbols to be inserted into the coded UCI symbols is given by:

$$\Theta = \lfloor Q'/11 \rfloor$$

where Q' is the number of coded UCI symbols as determined in the above embodiments and $\lfloor x \rfloor$ is the floor function that returns an integer no greater than x. With this embodiment, the same channel interleaving procedure in the current specifications can be reused by treating $Q'+\Theta$ as the total length of the coded UCI symbols.

Figure 21:
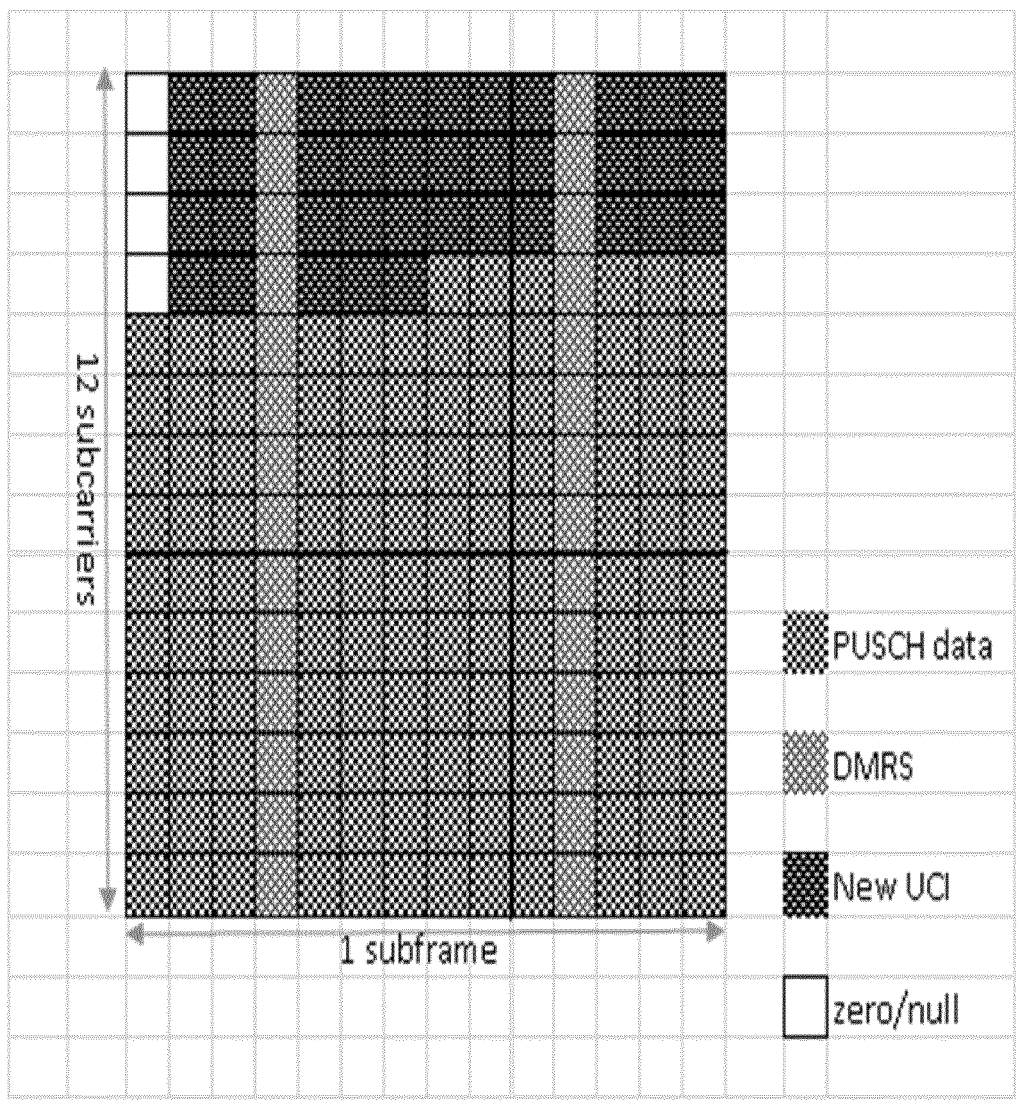
FIG. 21 is still another embodiment of mapping UCI and DMRS on time frequency resources where UCI is not encoded on the first OFDM symbol.
Figure 22:
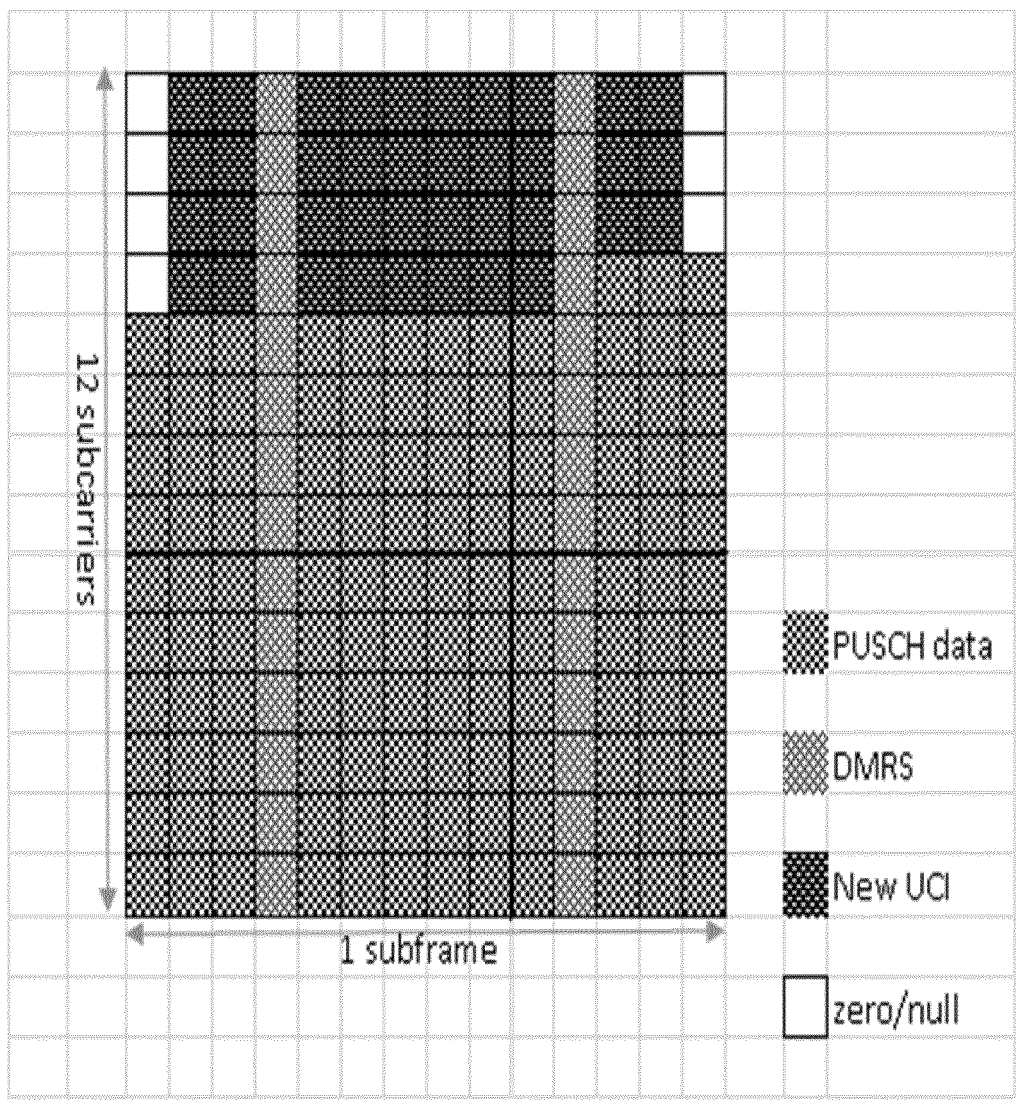
FIG. 22 is yet another embodiment of mapping UCI and DMRS on time frequency resources where UCI is not encoded on the first or last OFDM symbol.

The teaching of the fifth embodiment can also be applied to the second and fourth embodiment as illustrated in FIGS. 21 and 22.

Figure 23:
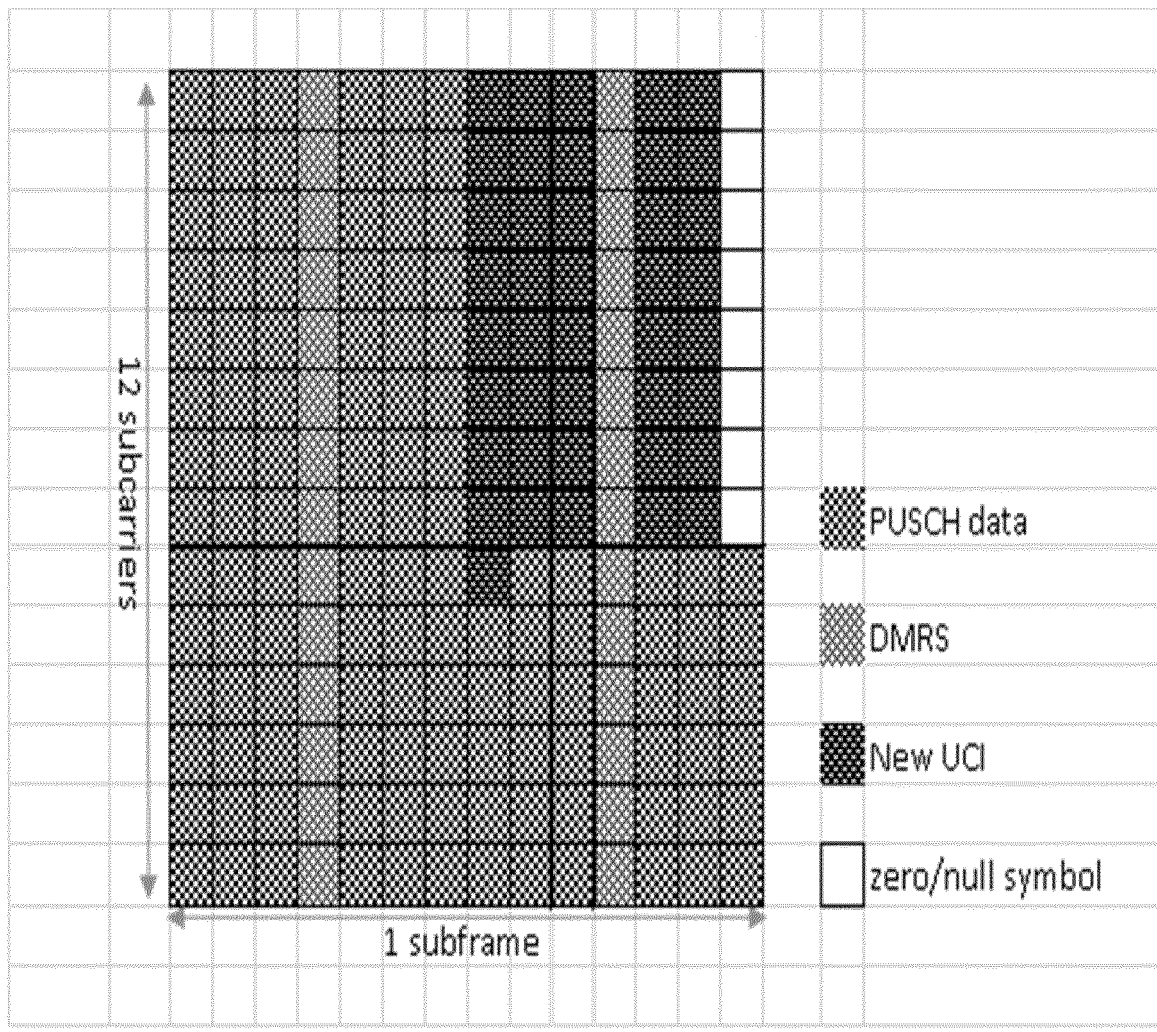
FIG. 23 is another embodiment of mapping UCI and DMRS on time frequency resources where UCI is encoded in the latter half of the subframe.

The teaching of the fifth embodiment can also be applied to the fourth embodiment where the codec UCI symbols are present only in the second slot. In this sixth embodiment, the number of zero or null symbols to be inserted into the coded UCI symbols is given by $\Theta = \lfloor Q'/5 \rfloor$. See FIG. 23.

Half Subframe Transmission on PUSCH

Figure 24:
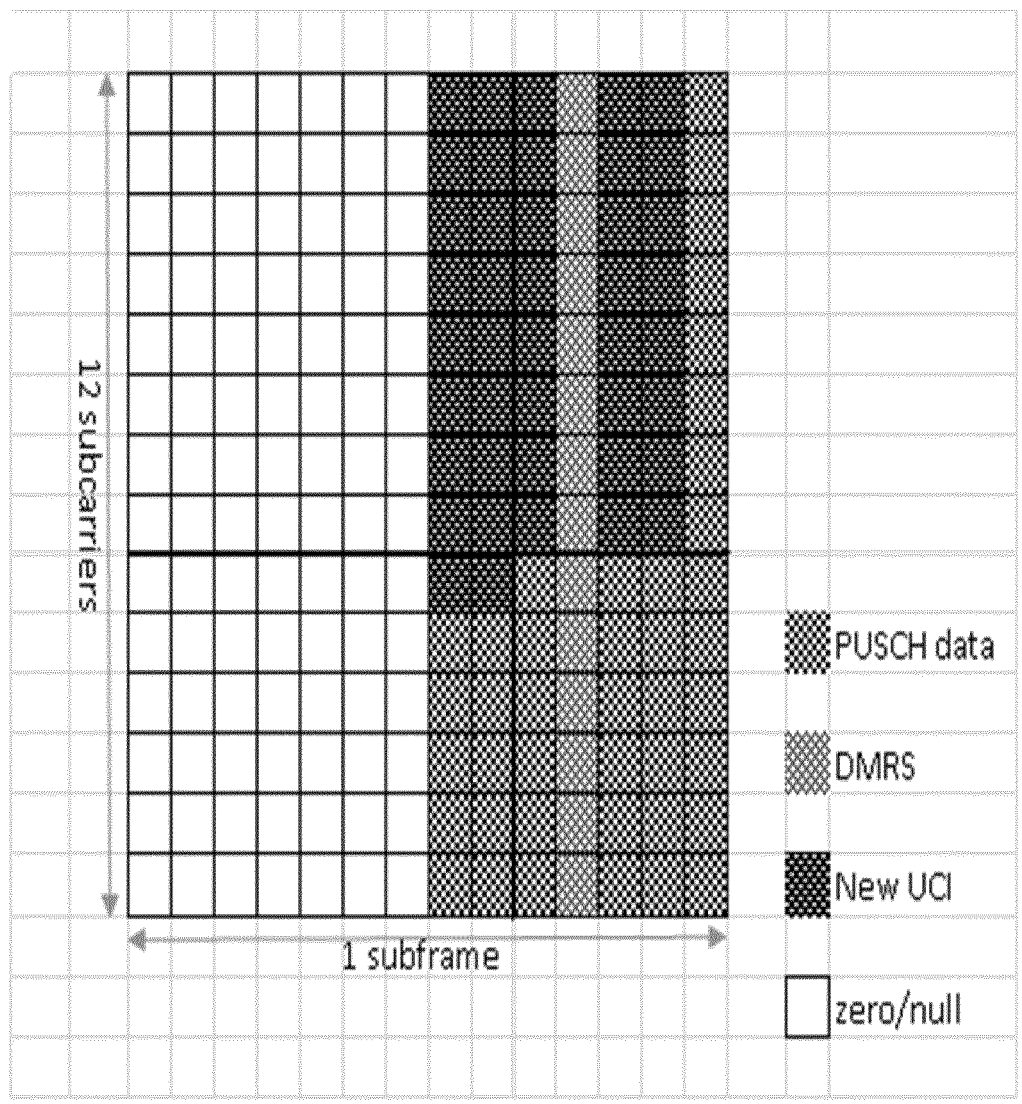
FIG. 24 is another embodiment of mapping UCI and DMRS on time frequency resources where no information is encoded in the first half of the subframe.
Figure 25:
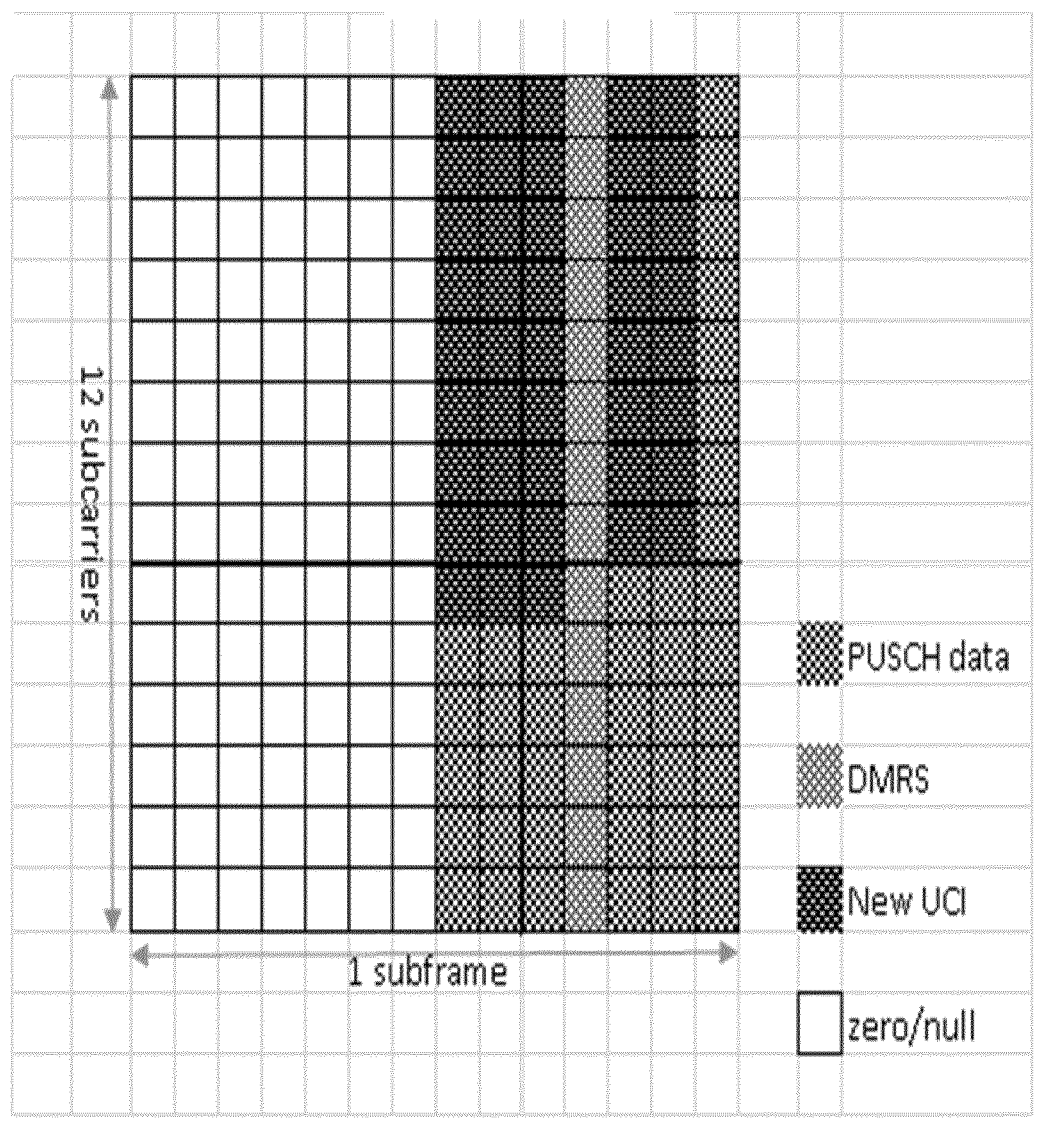
FIG. 25 is another embodiment of mapping UCI and DMRS on time frequency resources where no information is encoded in the first half of the subframe and no UCI is encoded in the last symbol of the subframe.
Figure 26:
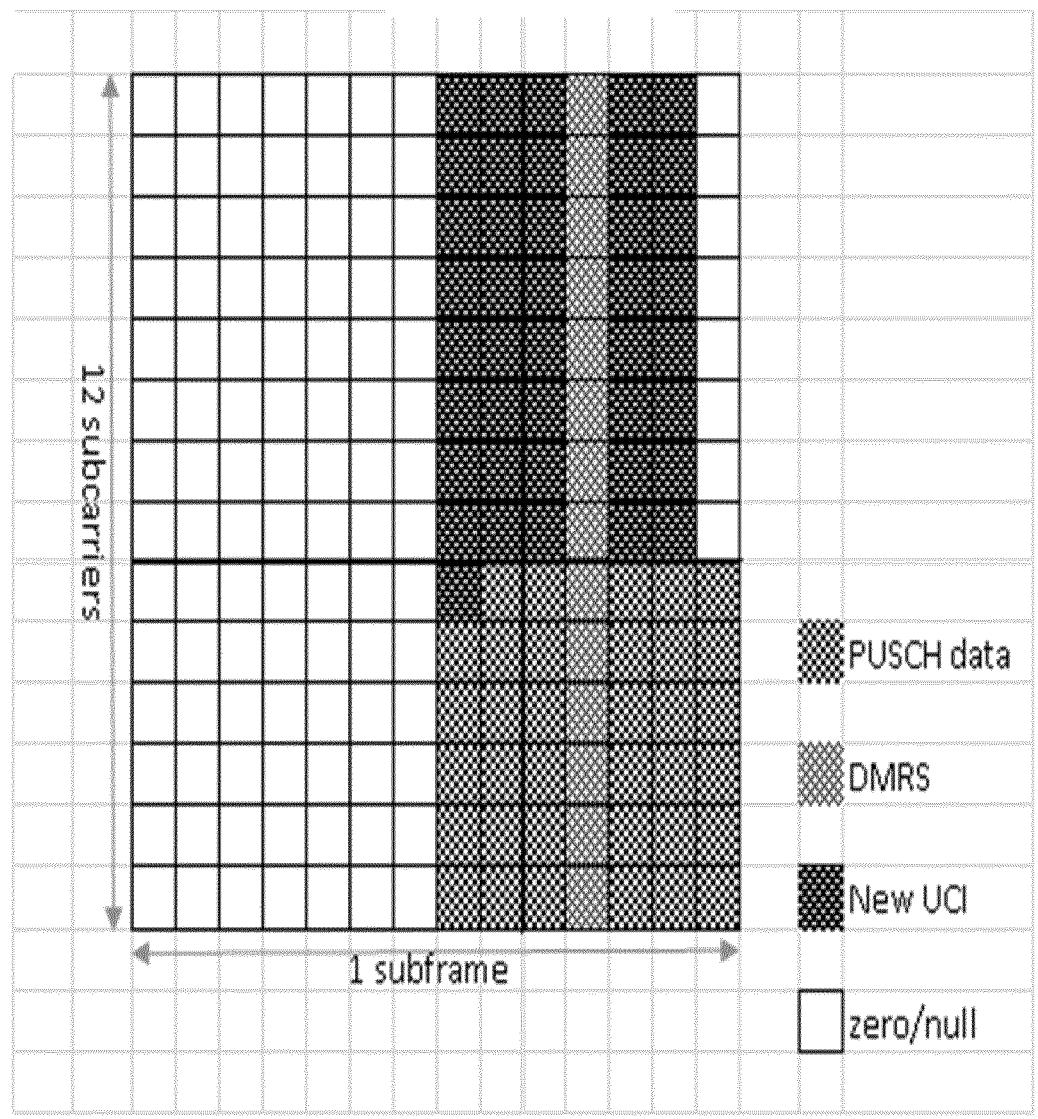
FIG. 26 is another embodiment of mapping UCI and DMRS on time frequency resources where no data is encoded in the first half of the subframe and the last symbol of the subframe.

This section includes methods and embodiments for new UCI on the PUSCH with half subframe transmission. Half subframe transmission may be applied for better channel access on unlicensed bands. Two schemes may be applied:

Rate matching: the wireless device 16 performs rate matching if it succeeds LBT at $2^{nd}$ slot;
Puncturing: the wireless device 16 discards the $1^{st}$ slot transmission if it succeeds LBT at $2^{nd}$ slot In a first embodiment, if rate matching is applied, the first subframe in a UL burst is a half subframe transmission, and UCI mapping is illustrated as follows. The latter subframes are treated as a full subframe transmission. One bit is included in the UCI to indicate whether the PUSCH for this subframe starts at symbol 0 or symbol 7. The network node 14 performs blind decoding whether the current subframe is a full subframe transmission or half subframe transmission. One bit can be added in the UCI to indicate whether the next subframe is a full subframe transmission or half subframe transmission to avoid network node 14 blind decoding on every subframe. See FIGS. 24-26.

In a second embodiment, if puncturing is applied, the wireless device 16 transmits UCI the same way as if it were a full subframe transmission, except that the wireless device 16 discards the PUSCH data and UCI mapped on the $1^{st}$ slot. Note that a shortened transmission time interval (sTTI) may be implemented in which case half subframe transmission on the PUSCH may be altered such that the starting symbol may be other than the seventh symbol. Also, full or half subframe transmission on the PUSCH may be altered such that the ending symbol may be other than the twelfth or thirteenth symbol.

In a third embodiment, if puncturing is applied, the UCI is only mapped on the $2^{nd}$ slot for the first subframe in an UL burst. The network node 14 performs blind decoding on whether the current subframe is a full subframe transmission or half subframe transmission.

UCI and Aperiodic CSI (A-CSI) on PUSCH

Since autonomous UL transmissions are initiated by the wireless device 16, such PUSCH transmissions will not carry aperiodic CSI feedback since such feedback is triggered by a network node 14 request.

To enhance the performance of the LAA system supporting autonomous UL access, additional embodiments are provided to enable aperiodic CSI feedbacks. In some embodiments, the network node 14 can request an aperiodic CSI feedback when it provides ACK/NACK feedback to the autonomous UL transmissions from the wireless device 16. This can be implemented as one bit in the DCI containing said ACK/NACK feedback.

In some embodiments, the wireless device 16 indicates whether aperiodic CSI feedback is included in the new UCI for autonomous UL access. The reason such indication may be desirable is because the network node 14 may miss the subframe containing such feedback due to interference, in which case the network node 14 will think the next successfully received subframe should contain the aperiodic CSI feedback. When such error happens, the UL transmission may fail.

Figure 27:
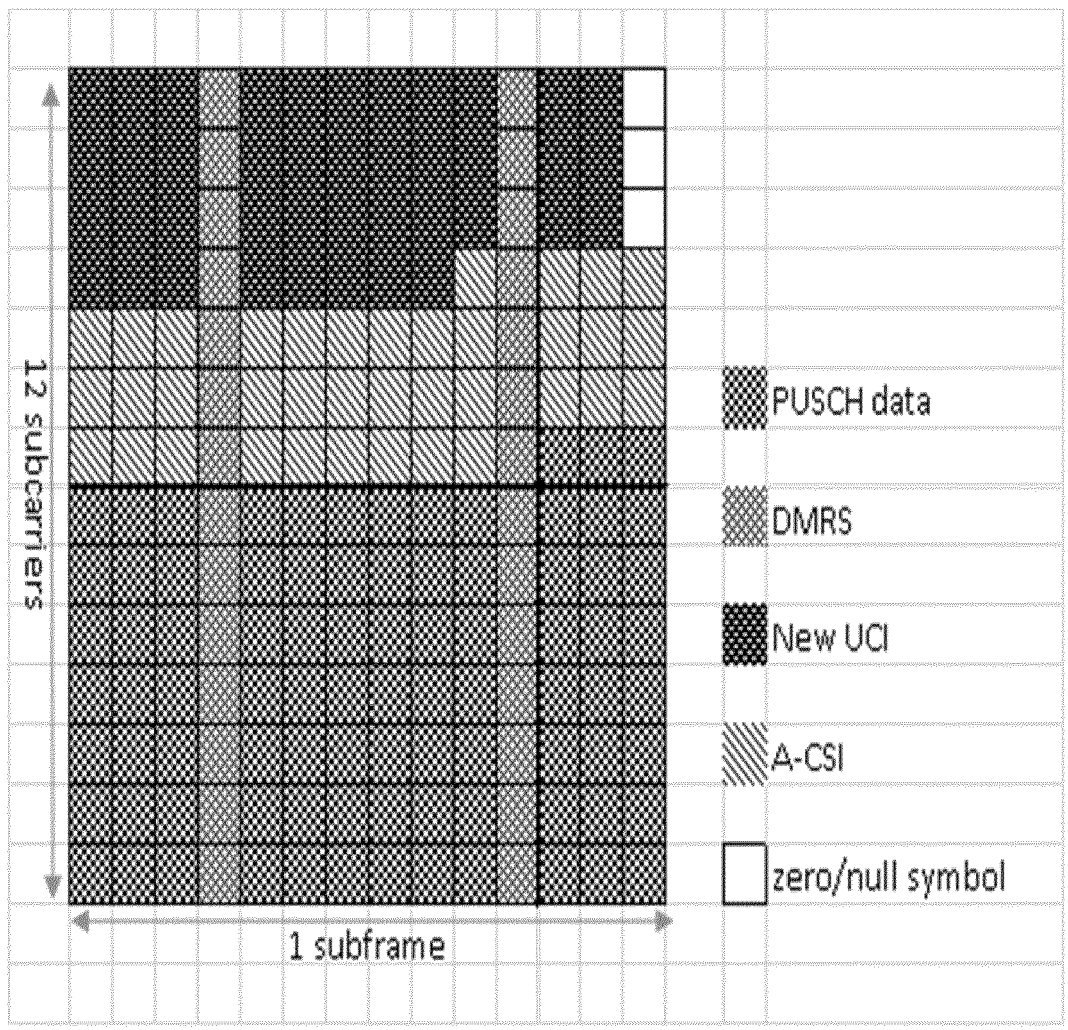
FIG. 27 is another embodiment of mapping UCI and DMRS on time frequency resources along with channel state information.

Since the new UCI provides vital information to the correct reception of the autonomous UL transmission, it is desirable for the network node 14 to be able to read the UCI unambiguously. Therefore, the coded symbols of the new UCI may be placed before the coded symbols of the aperiodic CSI. This teaching can be applied and combined with any of the above embodiments. For instance, in the case where a shortened UL subframe is supported, the new UCI (possibly with inserted zero/null symbols), aperiodic CSI and data symbols are written in sequence starting from lowest PRB index of allocated PUSCH transmission in frequency and in predefined symbols in time. This is illustrated in FIG. 27.

According to one aspect, a method performed by a wireless device 16 for autonomously transmitting uplink control information (UCI) together with autonomous uplink, AUL, data transmission. The method includes mapping the UCI to time-frequency resources of a physical uplink shared channel (PUSCH) (block S112). The method also includes transmitting the PUSCH with the UCI on an uplink transmission, the uplink transmission being without a dynamic uplink grant from a base station (block S114).

According to this aspect, in some embodiments, the UCI includes at least one of a starting and ending position of a physical uplink shared channel, PUSCH. In some embodiments, the UCI indicates whether the PUSCH on one of a current subframe and a next subsequent subframe is shortened. In some embodiments, the UCI includes at least one of a listen-before-talk, LBT, priority class, a number of subframes reserved for uplink transmission a hybrid automatic repeat request, HARQ, identification, a new data indicator, a redundancy version, a wireless device identifier, and a channel occupancy time, COT, indicator. In some embodiments, if the UCI is transmitted on the PUSCH, the UCI and the AUL data transmission are multiplexed such that the UCI is mapped from symbol 1 to symbol 12 of a subframe. In some embodiments, a beta offset value to account for different block error rate, BLER, targets and encoding schemes is configured in the wireless device 16 to determine how many coded modulation symbols to use for carrying the UCI in the PUSCH. In some embodiments, beta offset values are mapped by reusing a predetermined hybrid automatic repeat request, HARQ, acknowledgement, ACK, offset mapping table. In some embodiments, the beta offset value is fixed and predefined. In some embodiments, the UCI is mapped to the PUSCH starting from a first symbol in time of the PUSCH and from a lowest physical resource block, PRB, index in frequency of the PUSCH. In some embodiments, the UCI is mapped to the PUSCH starting from a second symbol in time of the PUSCH and from a lowest physical resource block, PRB, index in frequency of the PUSCH. In some embodiments, if a shortened PUSCH is supported, the UCI is mapped in a same manner that aperiodic channel state information, CSI, is mapped by starting from a lowest physical resource block, PRB, index but not on a first or last symbol of the PUSCH. In some embodiments, the PUSCH further includes aperiodic channel state information, CSI. In some embodiments, the method further includes determining a number of coded UCI symbols by one of calculation and reading from a look-up table based on a Modulation Coding Scheme, MCS, of the PUSCH. In some embodiments, the method further includes inserting one of zero and null symbols into coded UCI symbols to be mapped to the PUSCH. In some embodiments, UCI is transmitted on PUSCH starting from a seventh symbol in time of the PUSCH and from a lowest physical resource block, PRB, index in frequency of the PUSCH, wherein a bit in the UCI indicates half subframe transmission for the PUSCH. In some embodiments, the uplink transmission is without an uplink grant from the base station.

According to another aspect, a wireless device 16, wireless device, for autonomously transmitting uplink control information (UCI) together with autonomous uplink (AUL) data transmission is provided. The wireless device 16 includes processing circuitry 42 configured to map the UCI to time-frequency resources of a physical uplink shared channel (PUSCH) and transmit the PUSCH with the UCI on an uplink transmission, the uplink transmission being without a dynamic uplink grant from a base station.

According to this aspect, in some embodiments, the UCI includes at least one of a starting and ending position of a physical uplink shared channel (PUSCH). In some embodiments, the UCI indicates whether the PUSCH on one of a current subframe and a next subsequent subframe is shortened. In some embodiments, the UCI includes at least one of a listen-before-talk, LBT, priority class, a number of subframes reserved for uplink transmission a hybrid automatic repeat request, HARQ, identification, a new data indicator, a redundancy version, a wireless device identifier, and a channel occupancy time, COT, indicator. In some embodiments, if the UCI is transmitted on the PUSCH, the UCI and the AUL data transmission are multiplexed such that the UCI is mapped from symbol 1 to symbol 12 of a subframe. In some embodiments, a beta offset value to account for different block error rate, BLER, targets and encoding schemes is configured in the wireless device 16 to determine how many coded modulation symbols to use for carrying the UCI in the PUSCH. In some embodiments, beta offset values are mapped by reusing a predetermined hybrid automatic repeat request, HARQ, acknowledgement, ACK, offset mapping table. In some embodiments, the beta offset value is fixed and predefined. In some embodiments, the UCI is mapped to the PUSCH starting from a first symbol in time of the PUSCH and from a lowest physical resource block, PRB, index in frequency of the PUSCH. In some embodiments, the UCI is mapped to the PUSCH starting from a second symbol in time of the PUSCH and from a lowest physical resource block, PRB, index in frequency of the PUSCH. In some embodiments, if a shortened PUSCH is supported, the UCI is mapped in a same manner that aperiodic channel state information, CSI, is mapped by starting from a lowest physical resource block, PRB, index but not on a first or last symbol of the PUSCH. In some embodiments, the PUSCH further includes aperiodic channel state information, CSI. In some embodiments, the processing circuitry 42 is further configured to determine a number of coded UCI symbols by one of calculation and reading from a look-up table based on a Modulation Coding Scheme, MCS, of the PUSCH. In some embodiments, the processing circuitry 42 is further configured to insert one of zero and null symbols into coded UCI symbols to be mapped to the PUSCH. In some embodiments, UCI is transmitted on the PUSCH starting from a seventh symbol in time of the PUSCH and from a lowest physical resource block, PRB, index in frequency of the PUSCH, wherein a bit in the UCI indicates half subframe transmission for the PUSCH. In some embodiments, the uplink transmission is without an uplink grant from the base station.

According to yet another aspect, a method in a network node 14 for receiving uplink control information (UCI) together with autonomous uplink (UL) data transmission is provided. The method includes receiving a physical uplink shared channel (PUSCH) signal, the PUSCH having the UCI, the UCI indicating at least one of a starting and ending position of the PUSCH (block S100). The method further includes performing blind decoding to detect at least one of: a symbol at which the PUSCH the UCI ends; and a symbol at which the PUSCH the UCI begins (block S102).

According to this aspect, in some embodiments, the blind decoding determines whether the UCI begins at one of symbol 0 and symbol 1 of the PUSCH. In some embodiments, the blind decoding determines whether the UCI ends at one of symbol 12 and symbol 13 of the PUSCH. In some embodiments, the method further includes requesting aperiodic channel state information, CSI, feedback, the aperiodic CSI feedback being requested when an ACK/NACK feedback message is sent.

According to yet another aspect a network node 14 for receiving uplink control information (UCI) together with autonomous uplink (UL) data transmission, is provided. The network node 14 includes processing circuitry 22 including a memory and a processor. The memory is configured to store the UCI. The processor is configured to process a received physical uplink shared channel (PUSCH) signal, the PUSCH having the UCI, the UCI including at least one of a starting and ending position of the PUSCH, the processing including performing blind decoding to detect at least one of: at what symbol of the PUSCH the UCI ends; and at what symbol of the PUSCH the UCI begins.

According to this aspect, in some embodiments, the blind decoding determines whether the UCI begins at one of symbol 0 and symbol 1 of the PUSCH. In some embodiments, the blind decoding determines whether the UCI ends at one of symbol 12 and symbol 13 of the PUSCH. In some embodiments, the processor is further configured to request an aperiodic channel state information, CSI, feedback, the aperiodic CSI feedback being requested when an ACK/NACK feedback message is sent.

Some Additional Embodiments

Thus, in some embodiments, a method in a wireless device 16 for autonomously transmitting uplink control information (UCI) 50 together with autonomous uplink (UL) data transmission is provided. The method includes including in the UCI 50, at least one of a starting and ending position of a physical uplink shared channel (PUSCH); and mapping the UCI 50 to time-frequency resources of the PUSCH.

In some embodiments, the UCI 50 is mapped to the PUSCH starting from a first symbol in time of the PUSCH and from a lowest physical resource block, PRB, index in frequency of the PUSCH. In some embodiments, the UCI 50 is mapped to the PUSCH starting from a second symbol in time of the PUSCH and from a lowest physical resource block, PRB, index in frequency of the PUSCH. In some embodiments, the UCI 50 is mapped to a shortened PUSCH. In some embodiments, the method further includes determining a number of coded UCI symbols by calculation or reading from a look-up table based on at least a Modulation Coding Scheme, MCS, of the PUSCH, or by higher layer configuration from a network node 14. In some embodiments, the method further includes comprising inserting one of zero and null symbols into coded UCI symbols to be mapped to the PUSCH. In some embodiments, UCI is transmitted on PUSCH starting from the seventh symbol in time of the PUSCH and from a lowest physical resource block, PRB, index in frequency of the PUSCH, and a bit in the UCI indicates half subframe transmission for the PUSCH. In some embodiments, the method further comprises indicating whether an aperiodic channel state information, CSI, feedback is included in the UCI.

In some embodiments, a wireless device 16 for autonomously transmitting uplink control (UCI) 50 together with autonomous uplink (UL) data transmission is provided. The wireless device 16 includes processing circuitry 42 including a memory 44 and a processor 46. The memory 44 is configured to store UCI 50. The processor 46 is configured to include in the UCI 50, at least one of a starting and ending position of a physical uplink shared channel (PUSCH); and map the UCI 50 to time-frequency resources of the PUSCH.

In some embodiments, the UCI 50 is mapped to the PUSCH starting from a first symbol in time of the PUSCH and from a lowest physical resource block, PRB, index in frequency of the PUSCH. In some embodiments, the UCI 50 is mapped to the PUSCH starting from a second symbol in time of the PUSCH and from a lowest physical resource block, PRB, index in frequency of the PUSCH. In some embodiments, the UCI 50 is mapped to a shortened PUSCH. In some embodiments, the processor 46 is further configured to determine a number of coded UCI symbols by calculation or reading from a look-up table based on at least a Modulation Coding Scheme, MCS, of the PUSCH, or by higher layer configuration from a network node 14. In some embodiments, the processor 46 is further configured to insert one of zero and null symbols into coded UCI symbols to be mapped to the PUSCH. In some embodiments, UCI is transmitted on PUSCH starting from the seventh symbol in time of the PUSCH and from the lowest physical resource block, PRB, index in frequency of the PUSCH, and a bit in the UCI indicates half subframe transmission for the PUSCH.

In some embodiments, a wireless device 16 for autonomously transmitting uplink control information (UCI) 50 together with autonomous uplink (UL) data transmission is provided. The wireless device 16 includes a memory module 45 configured to store UCI. The wireless device 16 also includes a PUSCH configuration module 21 configured to: include in the UCI 50, at least one of a starting and ending position of a physical uplink shared channel (PUSCH); and map the UCI 50 to time-frequency resources of the PUSCH.

In some embodiments, a method in a network node 14 for receiving uplink control information, UCI, 30, together with autonomous uplink, UL, data transmission is provided. The method includes receiving a physical uplink shared channel, PUSCH, signal, the PUSCH having the UCI 30, the UCI 30 indicating at least one of a starting and ending position of the PUSCH. The method also includes performing blind decoding to detect at least one of: at what symbol of the PUSCH the UCI ends; and at what symbol of the PUSCH the UCI begins.

In some embodiments, the blind decoding determines whether the UCI 30 begins at one of symbol 0 and symbol 1 of the PUSCH. In some embodiments, the blind decoding determines whether the UCI 30 ends at one of symbol 12 and symbol 13 of the PUSCH. In some embodiments, the method further includes requesting an aperiodic channel state information, CSI, feedback, the aperiodic CSI feedback being requested when an ACK/NACK feedback is sent.

In some embodiments, a network node 14 for receiving uplink control information (UCI) together with autonomous uplink (UL) data transmission is provided. The network node 14 includes processing circuitry 22 including a memory 24 and a processor 26. The memory 24 is configured to store the UCI 30. The processor 26 is configured to: process a received physical uplink shared channel (PUSCH) signal, the PUSCH having the UCI 30, the UCI 30 including at least one of a starting and ending position of the PUSCH, the processing including performing blind decoding to detect at least one of: at what symbol of the PUSCH the UCI ends; and at what symbol of the PUSCH the UCI begins.

In some embodiments, the blind decoding determines whether the UCI begins at one of symbol 0 and symbol 1 of the PUSCH. In some embodiments, the blind decoding determines whether the UCI ends at one of symbol 12 and symbol 13 of the PUSCH. In some embodiments, the processor is further configured to request an aperiodic channel state information, CSI, feedback, the aperiodic CSI feedback being requested when an ACK/NACK feedback is sent.

In some embodiments, a network node 14 for receiving uplink control information (UCI) 30 together with autonomous uplink (AUL) data transmission is provided. The network node 14 includes a memory module 25 configured to store the UCI 30. The network node 14 also includes a PUSCH processing module 19 configured to: process a received physical uplink shared channel (PUSCH) signal, the PUSCH having the UCI 30, the UCI 30 including at least one of a starting and ending position of the PUSCH, the processing including performing blind decoding to detect at least one of: at what symbol of the PUSCH the UCI 30 ends; and at what symbol of the PUSCH the UCI 30 begins.

Abbreviations

BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB, base station
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless device for autonomously transmitting an uplink control information, UCI, transmission together with an autonomous uplink, AUL, data transmission, the AUL data transmission being an unscheduled transmission, on a physical uplink shared channel, PUSCH, comprising a subframe of 14 OFDM symbols, each of the 14 OFDM symbols being numbered from symbol 0 to symbol 13, the 14 OFDM symbols being ordered in a time domain according to each symbol's number, beginning with symbol 0 and ending with symbol 13, the PUSCH supporting a shortened data transmission, the method comprising:

mapping the UCI transmission to time-frequency resources of the PUSCH, the UCI transmission and the AUL data transmission being multiplexed on the subframe such that the UCI transmission is mapped on at least one symbol of the subframe according to one of:
only from symbol 1 to symbol 12 of the subframe, the AUL data transmission being mapped on at least one of symbol 0 and symbol 13 of the subframe; and
only from symbol 7 to symbol 12 of the subframe; and
transmitting the PUSCH with the UCI transmission on an uplink transmission.

2. The method of claim 1, wherein the UCI transmission includes at least one of a starting position and an ending position of the PUSCH.

3. The method of claim 1, wherein the UCI transmission indicates whether the PUSCH on one of a current subframe and a next subsequent subframe is shortened.

4. The method of claim 1, wherein the UCI transmission includes at least one of:
a listen-before-talk, LBT, priority class,
a number of subframes reserved for uplink transmission a hybrid automatic repeat request, HARQ, identification,
a new data indicator,
a redundancy version,
a wireless device identifier, and
a channel occupancy time, COT, indicator.

5. The method of claim 1, wherein a beta offset value to account for different block error rate, BLER, targets and encoding schemes is configured in the wireless device to determine how many coded modulation symbols to use for carrying the UCI transmission in the PUSCH.

6. The method of claim 5, wherein one of:
beta offset values are mapped by reusing a predetermined hybrid automatic repeat request, HARQ, acknowledgement, ACK, offset mapping table; and
the beta offset value is fixed and predefined.

7. The method of claim 1, wherein, if a shortened PUSCH is supported, the UCI transmission is mapped in a same manner that aperiodic channel state information, CSI, is mapped by starting from a lowest physical resource block, PRB, index but not on a first or last symbol of the PUSCH.

8. The method of claim 1, wherein the PUSCH further includes aperiodic channel state information, CSI.

9. The method of claim 1, further comprising determining a number of coded UCI symbols by one of calculation and reading from a look-up table based on a Modulation Coding Scheme, MCS, of the PUSCH.

10. The method of claim 1, further comprising inserting one of zero and null symbols into coded UCI symbols to be mapped to the PUSCH.

11. The method of claim 1, wherein UCI transmission is transmitted on the PUSCH starting from the seventh symbol in time of the PUSCH and from a lowest physical resource block, PRB, index in frequency of the PUSCH, wherein a bit in the UCI transmission indicates half subframe transmission for the PUSCH.

12. The method of claim 1, further comprising determining a number of coded UCI symbols according to:

$$Q' = \min\left(\left\lceil \frac{(O+L) \cdot M_{sc}^{PUSCH(x)} \cdot N_{symb}^{PUSCH(x)} \cdot \beta_{offset}^{UCI}}{\sum_{r=0}^{C^{(x)}-1} K_r^{(x)}} \right\rceil, M_{sc}^{PUSCH(x)} \cdot N_{symb}^{PUSCH}\right)$$

where O is a number of UCI bits, L is a number of CRC bits, $\beta_{offset}^{UCI}$ is a UCI beta offset value, $K_r^{(x)}$ is a number of bits for a code block r, $C^{(x)}$ is a number of code blocks, "x" in $K_r^{(x)}$ represents a transport block index corresponding to a highest $I_{MCS}$ value, $M_{SC}^{PUSCH(x)}$ is a scheduled bandwidth for the PUSCH transmission in the subframe for a transport block, and $N_{symb}^{PUSCH\ (x)}$ is a number of SC-FDMA symbols in the subframe.

13. A wireless device for autonomously transmitting an uplink control information, UCI, transmission together with an autonomous uplink, AUL, data transmission, the AUL data transmission being an unscheduled transmission, on a physical uplink shared channel, PUSCH, comprising a subframe of 14 OFDM symbols, each of the 14 OFDM symbols being numbered from symbol 0 to symbol 13, the 14 OFDM symbols being ordered in a time domain according to each symbol's number, beginning with symbol 0 and ending with symbol 13, the PUSCH supporting a shortened data transmission, the wireless device comprising:
processing circuitry configured to:
map the UCI transmission to time-frequency resources of the PUSCH, the UCI transmission and the AUL data transmission being multiplexed on the subframe such that the UCI transmission is mapped on at least one symbol of the subframe according to one of:
only from symbol 1 to symbol 12 of the subframe, the AUL data transmission being mapped on at least one of symbol 0 and symbol 13 of the subframe; and
only from symbol 7 to symbol 12 of the subframe; and
transmit the PUSCH with the UCI transmission on an uplink transmission.

14. The wireless device of claim 13, wherein the UCI transmission includes at least one of a starting and ending position of the PUSCH.

15. The wireless device of claim 13, wherein the UCI transmission indicates whether the PUSCH on one of a current subframe and a next subsequent subframe is shortened.

16. The wireless device of claim 13, wherein the UCI transmission includes at least one of:
a listen-before-talk, LBT, priority class,
a number of subframes reserved for uplink transmission a hybrid automatic repeat request, HARQ, identification,
a new data indicator,
a redundancy version,
a wireless device identifier,
and a channel occupancy time, COT, indicator.

17. The wireless device of claim 13, wherein a beta offset value to account for different block error rate, BLER, targets and encoding schemes is configured in the wireless device to determine how many coded modulation symbols to use for carrying the UCI transmission in the PUSCH.

18. The wireless device of claim 17, wherein one of:
beta offset values are mapped by reusing a predetermined hybrid automatic repeat request, HARQ, acknowledgement, ACK, offset mapping table; and
the beta offset value is fixed and predefined.

19. The wireless device of claim 13, wherein, if a shortened PUSCH is supported, the UCI transmission is mapped in a same manner that aperiodic channel state information, CSI, is mapped by starting from a lowest physical resource block, PRB, index but not on a first or last symbol of the PUSCH.

20. The wireless device of claim 13, wherein the PUSCH further includes aperiodic channel state information, CSI.

21. The wireless device of claim 13, wherein the processing circuitry is further configured to determine a number of coded UCI symbols by one of calculation and reading from a look-up table based on a Modulation Coding Scheme, MCS, of the PUSCH.

22. The wireless device of claim 13, wherein the processing circuitry is further configured to insert one of zero and null symbols into coded UCI symbols to be mapped to the PUSCH.

23. The wireless device of claim 13, wherein UCI transmission is transmitted on the PUSCH starting from a seventh symbol in time of the PUSCH and from a lowest physical resource block, PRB, index in frequency of the PUSCH, wherein a bit in the UCI transmission indicates half subframe transmission for the PUSCH.

24. A method in a network node for receiving an uplink control information, UCI, transmission together with an autonomous uplink, AUL, data transmission, the AUL data transmission being an unscheduled transmission, the method comprising:
receiving a physical uplink shared channel, PUSCH, signal, the PUSCH comprising a subframe of 14 OFDM symbols, each of the 14 OFDM symbols being numbered from symbol 0 to symbol 13, the 14 OFDM symbols being ordered in a time domain according to each symbol's number, beginning with symbol 0 and ending with symbol 13, the PUSCH supporting a shortened data transmission, the PUSCH having the UCI transmission and the AUL data transmission, the UCI and the AUL data transmission being multiplexed on the subframe such that the UCI transmission is mapped on at least one symbol of the subframe according to one of:
only from symbol 1 to symbol 12 of the subframe, the AUL data transmission being mapped on at least one of symbol 0 and symbol 13 of the subframe; and
only from symbol 7 to symbol 12 of the subframe, the UCI transmission indicating at least one of a starting position and an ending position of the PUSCH.

25. The method of claim 24, further comprising requesting aperiodic channel state information, CSI, feedback, the aperiodic CSI feedback being requested when an ACK/NACK feedback message is sent.

26. The method of claim 24, further comprising determining a number of coded UCI symbols according to:

$$Q' = \min\left(\left\lceil \frac{(O+L) \cdot M_{sc}^{PUSCH(x)} \cdot N_{symb}^{PUSCH(x)} \cdot \beta_{offset}^{UCI}}{\sum_{r=0}^{C^{(x)}-1} K_r^{(x)}} \right\rceil, M_{sc}^{PUSCH(x)} \cdot N_{symb}^{PUSCH}\right)$$

where O is a number of UCI bits, L is a number of CRC bits, $\beta_{offset}^{UCI}$ is a UCI beta offset value, $K_r^{(x)}$ is a number of bits for a code block r, C is a number of code blocks, "x" in $K_r^{(x)}$ represents a transport block index corresponding to a highest $I_{MCS}$ value, $M_{SC}^{PUSCH(x)}$ is a scheduled bandwidth for the PUSCH transmission in the subframe for a transport block, and $N_{symb}^{PUSCH(x)}$ is a number of SC-FDMA symbols in the subframe.

27. A network node for receiving an uplink control information, UCI, transmission together with an autonomous uplink, AUL, data transmission, the AUL data transmission being an unscheduled transmission, the network node comprising:
processing circuitry
configured to:
process a received physical uplink shared channel, PUSCH, signal, the PUSCH comprising a subframe of 14 OFDM symbols, each of the 14 OFDM symbols being numbered from symbol 0 to symbol 13, the 14 OFDM symbols being ordered in a time domain according to each symbol's number, beginning with symbol 0 and ending with symbol 13, the PUSCH supporting a shortened data transmission, the PUSCH having the UCI transmission and the AUL data transmission, the UCI and the AUL data transmission being multiplexed on the subframe such that the UCI transmission is mapped on at least one symbol of the subframe according to one of:
only from symbol 1 to symbol 12 of the subframe, the AUL data transmission being mapped on at least one of symbol 0 and symbol 13 of the subframe; and
only from symbol 7 to symbol 12 of the subframe, the UCI transmission including at least one of a starting position and an ending position of the PUSCH.

28. The network node of claim 27, wherein the processor is further configured to request an aperiodic channel state information, CSI, feedback, the aperiodic CSI feedback being requested when an ACK/NACK feedback message is sent.

29. A computer storage device storing a computer program, comprising instructions, which when executed on a computer cause the computer to perform a method for autonomously transmitting an uplink control information, UCI, transmission together with autonomous uplink, AUL, data transmission, the AUL data transmission being an unscheduled transmission, on a physical uplink shared channel, PUSCH, comprising a subframe of 14 OFDM symbols, each of the 14 OFDM symbols being numbered from symbol 0 to symbol 13, the 14 OFDM symbols being ordered in a time domain according to each symbol's number, beginning with symbol 0 and ending with symbol 13, the PUSCH supporting a shortened data transmission, the method comprising:
mapping the UCI transmission to time-frequency resources of the PUSCH, the UCI transmission and the AUL data transmission being multiplexed on the subframe such that the UCI transmission is mapped on at least one symbol of the subframe according to one of:
only from symbol 1 to symbol 12 of the subframe, the AUL data transmission being mapped on at least one of symbol 0 and symbol 13 of the subframe; and
only from symbol 7 to symbol 12 of the subframe; and
transmitting the PUSCH with the UCI transmission on an uplink transmission.

* * * * *